(12) United States Patent
Tsuchiya et al.

(10) Patent No.: US 12,729,951 B2
(45) Date of Patent: Sep. 8, 2026

(54) THICKNESS-DISTRIBUTION MEASUREMENT DEVICE AND THICKNESS-DISTRIBUTION MEASUREMENT METHOD

(71) Applicant: HAMAMATSU PHOTONICS K.K., Hamamatsu (JP)

(72) Inventors: Kunihiko Tsuchiya, Hamamatsu (JP); Toru Matsumoto, Hamamatsu (JP); Tetsuya Taka, Hamamatsu (JP); Kenichi Ohtsuka, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 34 days.

(21) Appl. No.: 18/854,197

(22) PCT Filed: Mar. 1, 2023

(86) PCT No.: PCT/JP2023/007633
§ 371 (c)(1),
(2) Date: Oct. 4, 2024

(87) PCT Pub. No.: WO2023/210154
PCT Pub. Date: Nov. 2, 2023

(65) Prior Publication Data

US 2025/0244123 A1 Jul. 31, 2025

(30) Foreign Application Priority Data

Apr. 27, 2022 (JP) ................................ 2022-073083

(51) Int. Cl.
*G01B 11/06* (2006.01)
*G01B 5/00* (2006.01)

(52) U.S. Cl.
CPC ........ *G01B 11/0625* (2013.01); *G01B 5/0002* (2013.01); *G01B 11/0691* (2013.01)

(58) Field of Classification Search
CPC ............ G01B 11/0625; G01B 11/0633; G01B 11/0675; G01B 11/0691; G01B 5/0002;
(Continued)

(56) References Cited

U.S. PATENT DOCUMENTS 5,889,593 A * 3/1999 Bareket .................... G03F 1/84 356/445
2009/0288754 A1* 11/2009 Kobayashi ............ G01N 21/21 156/64

(Continued)

FOREIGN PATENT DOCUMENTS

CN 111213049 A 5/2020
CN 112236084 A 1/2021

(Continued)

OTHER PUBLICATIONS

International Preliminary Report on Patentability mailed Nov. 7, 2024 for PCT/JP2023/007633.

(Continued)

*Primary Examiner* — Kara E. Geisel
*Assistant Examiner* — Jonathon Cook
(74) *Attorney, Agent, or Firm* — Faegre Drinker Biddle & Reath LLP

(57) ABSTRACT

A thickness-distribution measurement device includes a light source; a light detector; and a control device. The light source irradiates a region of an object being conveyed with light, the region extending in a width direction. The light detector detects emitted light that has transmitted through the object. The control device obtains information on a distribution of a relative thickness of the object in the width direction based on a detection result in the light detector. The light detector includes an image sensor and a lens array. The image sensor includes a plurality of pixels arranged in the width direction, and detects an intensity of the emitted light
(Continued)

for each pixel. The lens array includes a plurality of lenses having an equal magnification and arranged along the width direction, and collects the emitted light and forms an image of the emitted light on the image sensor.

12 Claims, 31 Drawing Sheets

(58) Field of Classification Search
CPC .................. G01B 15/02; G01B 15/025; G01N 2021/558; G01N 21/8422
See application file for complete search history.

(56) References Cited

U.S. PATENT DOCUMENTS

| | | | | |
|---|---|---|---|---|
| 2016/0349038 | A1 | 12/2016 | Ohtsuka et al. | |
| 2016/0370174 | A1* | 12/2016 | Bonino | G01B 11/0616 |
| 2017/0064124 | A1 | 3/2017 | Yoshida | |
| 2018/0172499 | A1 | 6/2018 | Yamano et al. | |
| 2018/0347965 | A1* | 12/2018 | Inoue | G01B 9/02024 |
| 2019/0149750 | A1* | 5/2019 | Thebault | H04N 23/73 348/302 |
| 2021/0223028 | A1* | 7/2021 | Taguchi | G01B 11/0625 |
| 2022/0297257 | A1* | 9/2022 | Huang | H01L 21/30625 |
| 2023/0175973 | A1* | 6/2023 | Kagawa | G01N 21/94 356/446 |

FOREIGN PATENT DOCUMENTS

| | | | |
|---|---|---|---|
| CN | 112385049 | A | 2/2021 |
| JP | 2000-241125 | A | 9/2000 |
| JP | 2004-219108 | A | 8/2004 |
| JP | 2013-190224 | A | 9/2013 |
| JP | 2015-141176 | A | 8/2015 |
| JP | 2017-046241 | A | 3/2017 |
| JP | 2020-170973 | A | 10/2020 |
| TW | 577109 | B | 2/2004 |
| TW | 201719164 | A | 6/2017 |
| WO | WO-2009/090871 | A1 | 7/2009 |
| WO | WO-2016/199683 | A1 | 12/2016 |

OTHER PUBLICATIONS

European Search Report for EP Patent Application No. 23795902.8, Issued on Jan. 13, 2026, 8 pages.

* cited by examiner 30
311
31
34
32
34a
Lb
313
318
33
319
315
Lb
314
312
D1
D2
D3

(a)

(b)

30A
311
31
34
32
35
34a
Lb
313
318
33
319
315
Lb
314
312
D1
D2
D3

(a)

(b)

(a)
RELATIVE THICKNESS
POSITION IN CONVEYING DIRECTION
(b)
RELATIVE THICKNESS
S
S
S
POSITION IN CONVEYING DIRECTION

THICKNESS-DISTRIBUTION MEASUREMENT DEVICE AND THICKNESS-DISTRIBUTION MEASUREMENT METHOD

TECHNICAL FIELD

The present disclosure relates to a thickness-distribution measurement device and a thickness-distribution measurement method.

BACKGROUND ART

Patent Literature 1 discloses a film thickness measurement device. The film thickness measurement device is a device that measures a film thickness of an object to be measured. The object to be measured includes a substrate having a front surface and a back surface; a first film formed on the front surface; and a second film formed on the back surface. The film thickness measurement device includes a light irradiation unit, a light detector, and a film thickness calculation unit. The light irradiation unit irradiates a front surface side of the object to be measured with light. The light detector detects an intensity of reflected light on the front surface side of the object to be measured for each wavelength. The film thickness calculation unit determines a film thickness of the first film by comparing a reflectance for each wavelength obtained based on the detection result in the light detector and a theoretical reflectance for each wavelength. The theoretical reflectance for each wavelength takes into account a reflectance and a transmittance on the front surface side and a reflectance on a back surface side.

Patent Literature 2 and Patent Literature 3 disclose a sensor unit of an image reading device.

CITATION LIST

Patent Literature

Patent Literature 1: Japanese Unexamined Patent Publication No. 2015-141176

Patent Literature 2: Japanese Unexamined Patent Publication No. 2020-170973

Patent Literature 3: Japanese Unexamined Patent Publication No. 2017-046241

SUMMARY OF INVENTION

Technical Problem

There is a demand for checking a distribution of a relative thickness of a plate-shaped or film-shaped object, which has a certain degree of width, in a width direction while the object is conveyed in a direction intersecting the width direction. For example, when a polymer film is manufactured, it is desirable to form a material for the polymer film into a film shape by stretching the material in a longitudinal direction and a lateral direction, and then inspect and check that the thickness of the film is uniform.

Conventionally, as a method for measuring a thickness of an object, there is a spectral interferometry. In the spectral interferometry, an object is irradiated with light, and an intensity of interference light between reflected light on a light irradiation surface of the object and reflected light on a surface opposite to the light irradiation surface of the object is measured. A thickness of the object can be obtained based on a change in the intensity of the interference light depending on the wavelength. However, this method is a method for locally measuring the thickness of the object. Therefore, when a distribution of the thickness of the object is wanted to be checked while the object is conveyed, a plurality of measurement units each including an irradiation unit that irradiates the object with light and a measurement unit that measure the interference light need to be disposed side by side. In that case, the larger the width of the object is, the larger the number of the measurement units needs to be, and the configuration becomes complicated.

An object of the present disclosure is to provide a thickness-distribution measurement device and a thickness-distribution measurement method in which a distribution of a relative thickness of an object being conveyed can be checked while the object is conveyed, with a simple configuration.

Solution to Problem

[1] A thickness-distribution measurement device according to one embodiment of the present disclosure includes a conveyor; a light source; a light detector; and an arithmetic processor. The conveyor conveys an object having a first surface and a second surface in a conveying direction along the first surface and the second surface, the second surface facing opposite to the first surface. The light source is disposed at a position facing the second surface of the object, and irradiates a region of the object being conveyed with light, the region extending in a width direction intersecting the conveying direction. The light detector is disposed at a position facing the first surface of the object, and detects emitted light that has transmitted through the object irradiated with the light. The arithmetic processor obtains information on a distribution of a relative thickness of the region of the object in the width direction based on a detection result in the light detector. The light detector includes an image sensor and a lens unit. The image sensor includes a pixel unit including a plurality of pixels arranged at least in the width direction, and detects an intensity of the emitted light for each pixel to output image data. The lens unit includes a plurality of lenses having an equal magnification and arranged along the width direction, and collects the emitted light and forms an image of the emitted light on the pixel unit of the image sensor.

[2] A thickness-distribution measurement method according to one embodiment of the present disclosure includes a step of starting to convey an object having a first surface and a second surface in a conveying direction along the first surface and the second surface, the second surface facing opposite to the first surface; a step of starting to irradiate a region of the object being conveyed with light, the region extending in a width direction intersecting the conveying direction; a step of starting to detect emitted light that has transmitted through the object irradiated with the light; and a step of obtaining information on a distribution of a relative thickness of the region of the object in the width direction based on a detection result in the step of detecting. In the step of detecting, an image sensor that includes a pixel unit including a plurality of pixels arranged at least in the width direction, and that detects an intensity of the emitted light for each pixel to output image data, and a lens unit that includes a plurality of lenses having an equal magnification and arranged along the width direction, and that collects the emitted light and forms an image of the emitted light on the pixel unit of the image sensor are used.

When the light transmittance of the object is uniform, the amount of light absorption inside the object depends on the thickness of the object. Therefore, by irradiating the region of the object with the light, the region extending in the width direction, and detecting the light intensity of the emitted light from the region, the distribution of the relative thickness of the object in the width direction can be measured. According to the thickness-distribution measurement device and the thickness-distribution measurement method, since the light intensity of the emitted light is detected using the image sensor including the plurality of pixels arranged in the width direction, the configuration can be simplified compared to the spectral interferometry in which a plurality of measurement units are disposed side by side in the width direction of the object. In addition, by collecting the emitted light and forming an image of the emitted light on the image sensor using the lens unit including the plurality of lenses having an equal magnification and arranged in the width direction, the lens unit can be disposed in proximity to the object to increase the collection efficiency of the emitted light and to increase detection sensitivity. Therefore, even with a simple configuration, the distribution of the relative thickness can be measured with practical accuracy.

In the thickness-distribution measurement device, the light source is disposed to face the second surface, and the light detector is disposed to face the first surface. Furthermore, the emitted light from the object is light that has transmitted through the object. In such a manner, by disposing the light source and the light detector such that the object is sandwiched therebetween, and detecting light that has transmitted through the object, as the emitted light from the object, the light intensity of the emitted light is made to greatly depend on the thickness of the object. Therefore, the measurement accuracy of the distribution of the relative thickness can be further improved.

[3] In the thickness-distribution measurement device according to [1] and the thickness-distribution measurement method according to [2], an optical axis of the lens unit may be along a normal line to the first surface. In this case, since the light emitted perpendicularly from a front surface of the object is detected, the influence of a polarization state on the light intensity of the emitted light can be avoided, and the measurement accuracy of the distribution of the relative thickness can be further improved.

[4] In the thickness-distribution measurement device according to [1] and the thickness-distribution measurement method according to [2], an optical axis of the lens unit may be inclined with respect to a normal line to the first surface. In this case, the detection of scratches existing on the front surface of the object can be easily performed at the same time with the measurement of the distribution of the relative thickness. An inclination angle of the optical axis of the lens unit with respect to the normal line may be 5° or more and 80° or less.

[5] In the thickness-distribution measurement device according to any [1], [3], or [4] and the thickness-distribution measurement method according to any of [2] to [4], the image sensor may be configured to be able to switch a gain value for amplifying signals output from the plurality of pixels. In this case, even when the light intensity of the emitted light changes, the distribution of the relative thickness can be measured without replacing the image sensor.

[6] The thickness-distribution measurement device according to [5] may further include another light source. The another light source is disposed at a position facing the first surface, and irradiates the region or another region of the object being conveyed with light, the another region extending in the width direction. Furthermore, the light detector may detect emitted light emitted from the object irradiated with the light by the another light source. The gain value of the image sensor when irradiation with the light from the another light source is performed may be different from the gain value of the image sensor when irradiation with the light from the light source is performed. In this case, the emitted light from a surface irradiated with light and the emitted light from a surface opposite to the surface irradiated with light can be detected using one device. Therefore, the information on the distribution of the relative thickness can be obtained based on the detection results of these emitted lights, so that the measurement accuracy of the distribution of the relative thickness can be further improved.

[7] The thickness-distribution measurement device according to any of [1] and [3] to [6] may further include a thickness measurement unit that locally measures an absolute thickness of the object. Furthermore, the arithmetic processor may correct a measurement value of the relative thickness based on the absolute thickness measured by the thickness measurement unit. Similarly, the thickness-distribution measurement method according to any of [2] to [5] and [7] may further include a step of locally measuring an absolute thickness of the object, and in the step of obtaining the information, a measurement value of the relative thickness may be corrected based on the absolute value measured by the step of measuring. In the thickness-distribution measurement device, when the intensity of the light output from the light source varies over time, the intensity of the measured emitted light also varies over time. Similarly, in the thickness-distribution measurement method, when the intensity of the light with which irradiation is performed in the step of starting to irradiate varies over time, the measured intensity of the emitted light also varies over time. By performing correction based on the absolute thickness measured by the thickness measurement unit (the step of measuring), the measurement accuracy of the distribution of the relative thickness can be further improved. The thickness measurement unit may use a spectral interferometry. In the step of measuring, the spectral interferometry may be used.

[8] In the thickness-distribution measurement device according to any of [1] and [3] to [7], the image sensor may be a line scan sensor.

[9] In the thickness-distribution measurement device according to any of [1] and [3] to [8], the light detector may further include a first optical filter and a second optical filter. The first optical filter is provided on some pixels among the plurality of pixels of the image sensor, and has a transmission wavelength band centered at a first wavelength. The second optical filter is provided on at least some other pixels among the plurality of pixels of the image sensor, and has a transmission wavelength band centered at a second wavelength different from the first wavelength. As described above, when the intensity of the light output from the light source varies over time, the measured intensity of the emitted light also varies over time. Therefore, the measurement results of the distribution of the relative thickness differ for each wavelength. As a result, it can be known that the intensity of the light output from the light source varies over time.

Advantageous Effects of Invention

According to the present disclosure, it is possible to provide the thickness-distribution measurement device and the thickness-distribution measurement method in which the distribution of the thickness of the object being conveyed can be checked with a simple configuration.

DESCRIPTION OF EMBODIMENTS

Hereinafter, embodiments of a thickness-distribution measurement device and a thickness-distribution measurement method according to the present disclosure will be described in detail with reference to the accompanying drawings. In the description of the drawings, the same elements are denoted by the same reference signs, and duplicate descriptions will be omitted.

Figure 1:
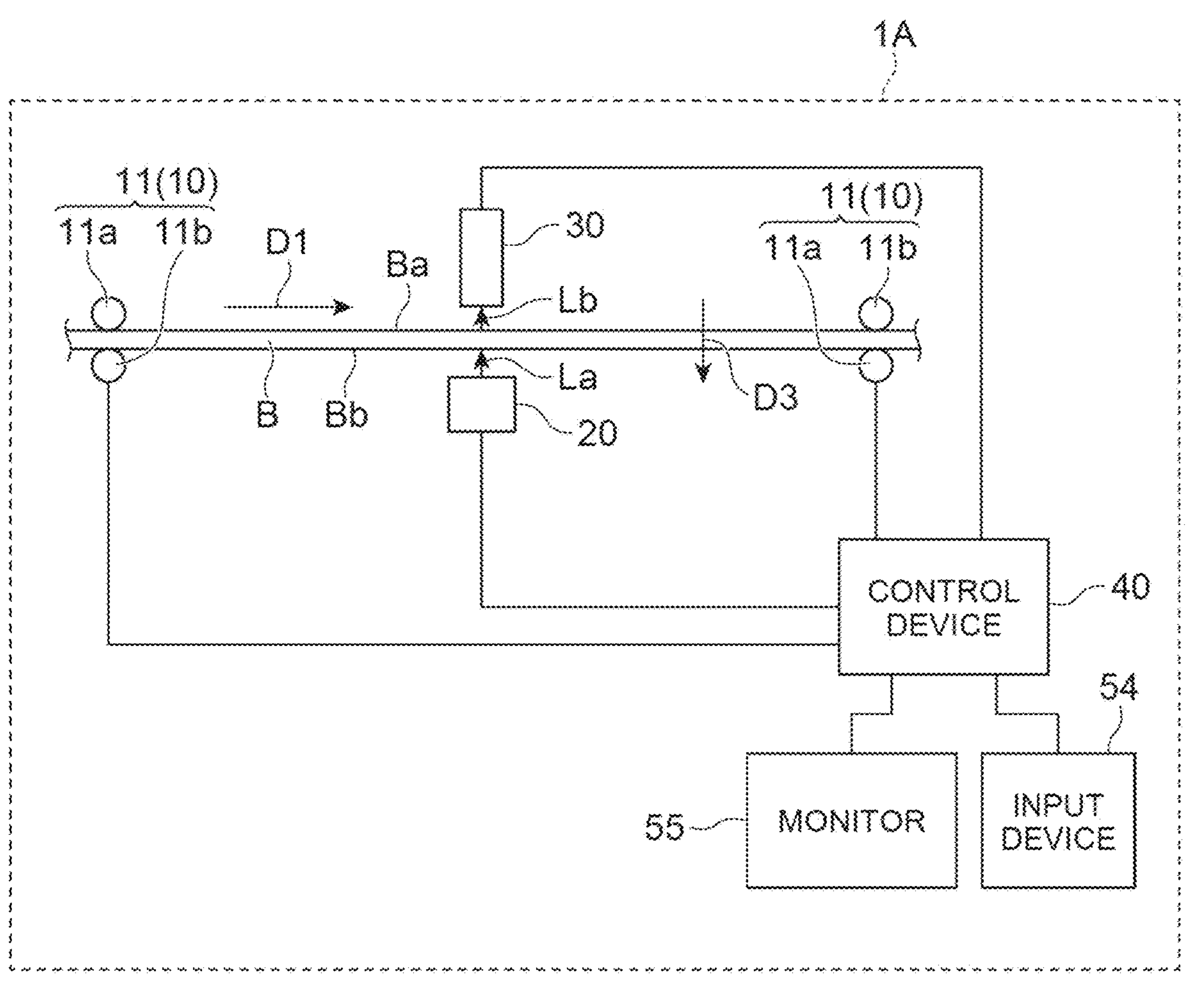
FIG. 1 is a view schematically illustrating a configuration of a thickness-distribution measurement device according to one embodiment.

FIG. 1 is a view schematically illustrating a configuration of a thickness-distribution measurement device 1A according to one embodiment of the present disclosure. The thickness-distribution measurement device 1A is a device that obtains information on a distribution of a relative thickness of an object B. The distribution of the relative thickness referred to here refers to a distribution of a relative thickness of the object B in a width direction of the object B. The object B is a plate-shaped object or a sheet-shaped object having a first surface Ba and a second surface Bb facing opposite to the first surface Ba. In one example, the object B is a polymer film, fabrics such as cloth or non-woven fabric, paper, a substrate, or the like being conveyed. The object B of the present embodiment is composed of a single layer (single material), and does not have a structure in which a plurality of layers are laminated. The width direction of the object B means a direction intersecting both a conveying direction D1 and a thickness direction D3. In one example, the width direction of the object B is orthogonal to both the conveying direction D1 and the thickness direction D3. During conveyance, the thickness direction D3 is, for example, along a vertical direction.

As illustrated in FIG. 1, the thickness-distribution measurement device 1A of the present embodiment includes a conveyor 10, a light source 20, a light detector 30, a control device 40, an input device 54, and a monitor 55. The conveyor 10 conveys the object B in the conveying direction D1 along the first surface Ba and the second surface Bb. The conveyor 10 is, for example, a roller conveyor, and includes a plurality of roller pairs 11 and a drive unit (not illustrated) such as a motor that rotationally drives the plurality of roller pairs 11. Each of the plurality of roller pairs 11 includes a pair of rollers 11*a* and 11*b* having rotation axes extending in the width direction of the object B. The object B is conveyed by rotating the roller 11*a* and the roller 11*b* in opposite directions in a state where the object B is sandwiched between the roller 11*a* and the roller 11*b*.

Figure 2:
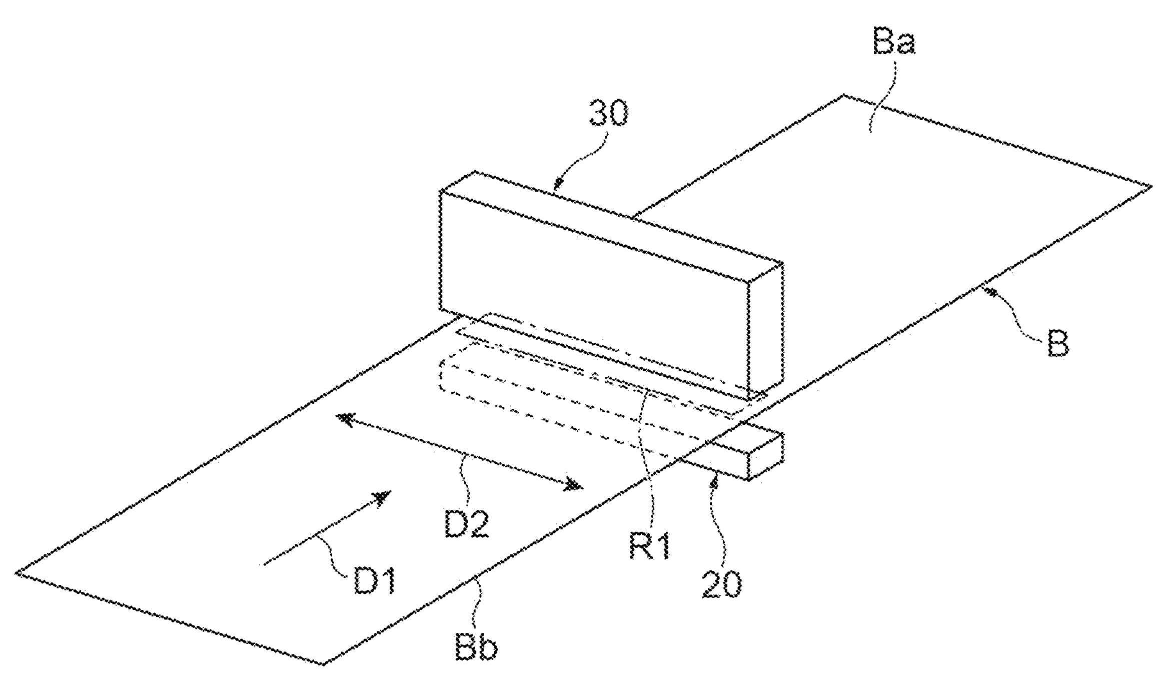
FIG. 2 is a perspective view illustrating a light source and a light detector.

FIG. 2 is a perspective view illustrating the light source 20 and the light detector 30. The light source 20 is disposed at a position facing one of the first surface Ba and the second surface Bb of the object B. In the illustrated example, the light source 20 is disposed at a position facing the second surface Bb. The light source 20 irradiates a region R1 of the object B being conveyed with light La (refer to FIG. 1), the region R extending in the width direction D2. The region R1 extends from one end edge to the other end edge of the object B in the width direction D2. The light source 20 has, for example, a configuration in which a plurality of light-emitting elements are arranged along the width direction D2. A light-emitting diode (LED) is provided as an example of the light-emitting element; however, the light-emitting element is not limited thereto. The emission wavelengths and the emission intensities of the plurality of light-emitting elements are uniform among the plurality of light-emitting elements. The light La output from the light source 20 is light that is continuous over time. A wavelength of the light La may be included in the visible range, or may be included in the near-infrared range.

The light detector 30 is disposed at a position facing the other of the first surface Ba and the second surface Bb of the object B. In the illustrated example, the light detector 30 is disposed at a position facing the first surface Ba. The light detector 30 faces the light source 20 with the object B sandwiched therebetween. The light detector 30 detects emitted light Lb from the object B irradiated with the light La. In the present embodiment, the emitted light Lb from the object B is the light La that has transmitted through the object B.

Figure 3:
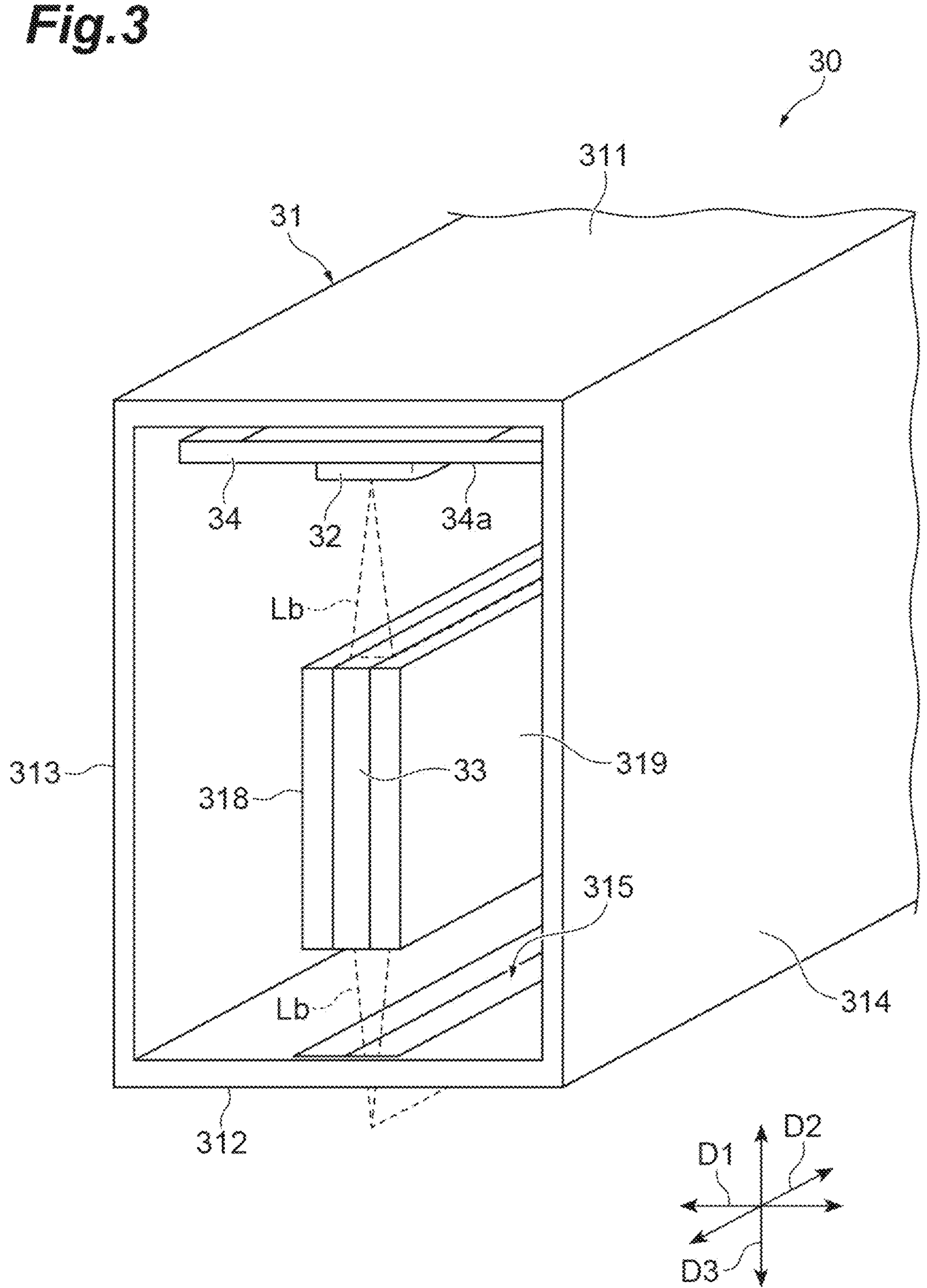
FIG. 3 is a cutout perspective view illustrating an internal structure of the light detector.

FIG. 3 is a cutout perspective view illustrating an internal structure of the light detector 30. As illustrated in FIG. 3, the light detector 30 includes a housing 31, an image sensor 32, a lens array 33, a circuit substrate 34, and holding members 318 and 319. The housing 31 is a hollow container having a rectangular parallelepiped appearance extending along the width direction D2. The housing 31 includes a top plate 311, a bottom plate 312, and side plates 313 and 314. The top plate 311 and the bottom plate 312 face each other in the thickness direction D3. The side plate 313 extends along the thickness direction D3, and connects one end edge of the top plate 311 in the conveying direction D1 and one end edge of the bottom plate 312 in the conveying direction D1. The side plate 314 extends along the thickness direction D3, and connects the other end edge of the top plate 311 in the conveying direction D1 and the other end edge of the bottom plate 312 in the conveying direction D1. The housing 31 accommodates the image sensor 32, the lens array 33, the circuit substrate 34, and the holding members 318 and 319. A slit 315 extending along the width direction D2 is formed in the bottom plate 312 of the housing 31. The emitted light Lb from the object B reaches the inside of the housing 31 through the slit 315.

Figure 4:
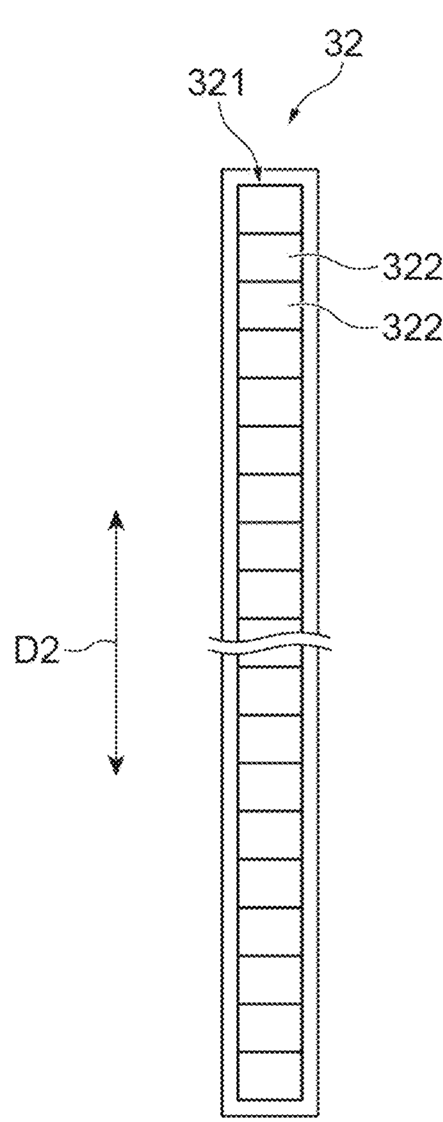
FIG. 4 is a plan view of an image sensor.
Figure 5:
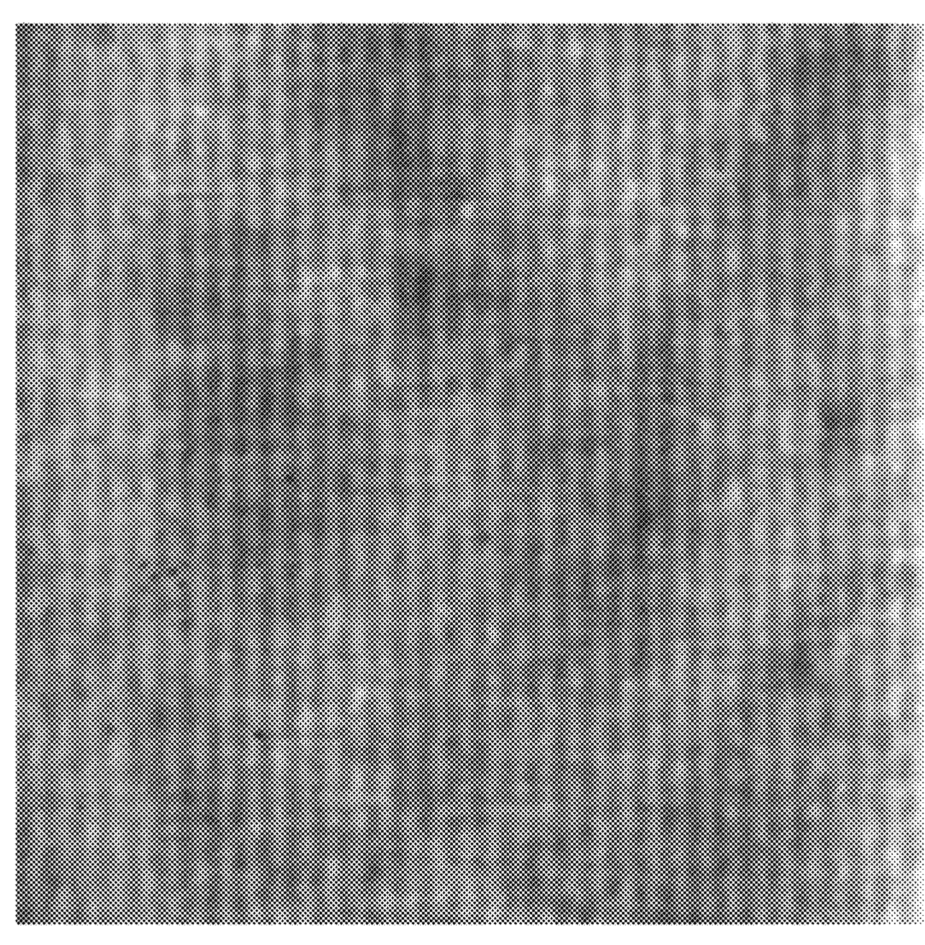
FIG. 5 is one example of image data obtained by the image sensor.

FIG. 4 is a plan view of the image sensor 32. The image sensor 32 is, for example, a line scan sensor, and includes a pixel unit 321 having the width direction D2 as a longitudinal direction. The pixel unit 321 includes a plurality of pixels 322 arranged at least along the width direction D2. Each of the pixels 322 includes a photodiode. The image sensor 32 detects an intensity of the emitted light Lb for each of the pixels 322, and generates image data. The image sensor 32 repeatedly performs the generation of such image data at predetermined time periods. FIG. 5 is one example of the image data obtained by the image sensor 32. The image sensor 32 outputs the generated image data to the control device 40. As illustrated in FIG. 3, the image sensor 32 is mounted on the circuit substrate 34. The circuit substrate 34 is attached and fixed to the top plate 311 such that a mounting surface 34*a* on which the image sensor 32 is mounted faces the bottom plate 312 and a surface opposite to the mounting surface 34*a* faces the top plate 311.

Figure 6:
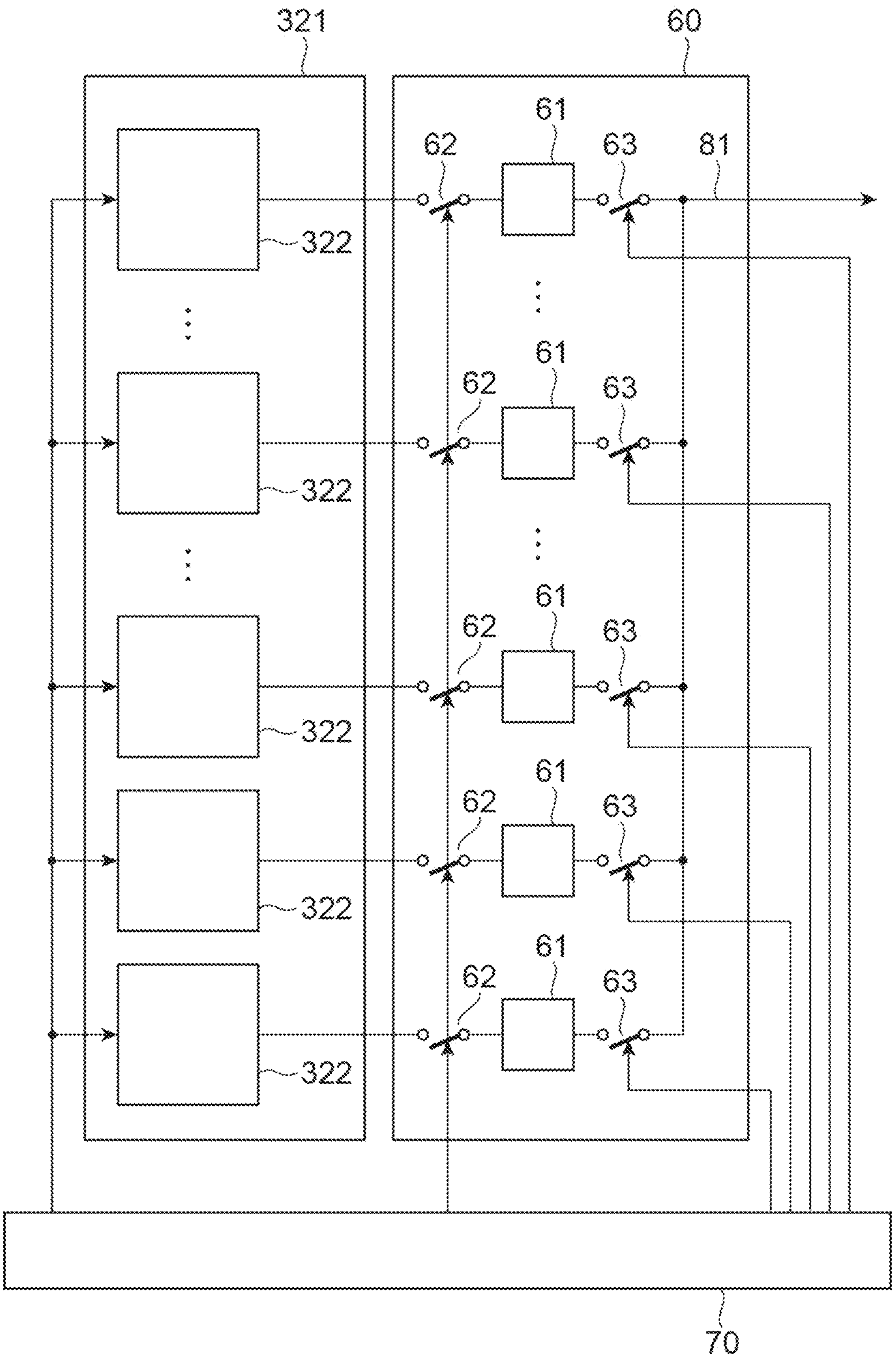
FIG. 6 is a diagram illustrating a configuration of an internal circuit of the image sensor.

FIG. 6 is a diagram illustrating a configuration of an internal circuit of the image sensor 32. As described above, the image sensor 32 includes the pixel unit 321 in which the plurality of pixels 322 are arranged along the width direction D2. The plurality of pixels 322 have a configuration common to each other. The image sensor 32 further includes a readout circuit 60 and a sensor control unit 70. The readout circuit 60 and the pixel unit 321 of the image sensor 32 are controlled by the control device 40 and the sensor control unit 70. The image sensor 32 sequentially outputs a voltage value corresponding to the amount of incident light on each of the pixels 322 from the readout circuit 60 to the control device 40 via a video line 81.

The readout circuit 60 includes a plurality of hold circuits 61, a plurality of switches 62, and a plurality of switches 63 that correspond one-to-one to the pixels 322. Each of the hold circuits 61 is connected to an output end of the pixel 322 via the corresponding switch 62. Each of the hold circuits 61 holds the voltage value output from the pixel 322 immediately before the corresponding switch 62 changes from an on state to an off state. Each of the hold circuits 61 is connected to the video line 81 via the corresponding switch 63. Each of the hold circuits 61 outputs the held voltage value to the video line 81 when the corresponding switch 63 is in an on state.

The plurality of switches 62 are controlled by a control signal given from the sensor control unit 70, and are switched on and off at the same timing. The plurality of switches 63 are controlled by another control signal given from the sensor control unit 70, and are sequentially turned on for a certain period. The sensor control unit 70 also controls operation of each of the plurality of pixels 322 in addition to controlling the on and off of each of the plurality of switches 62 and each of the plurality of switches 63 of the readout circuit 60.

Figure 7:
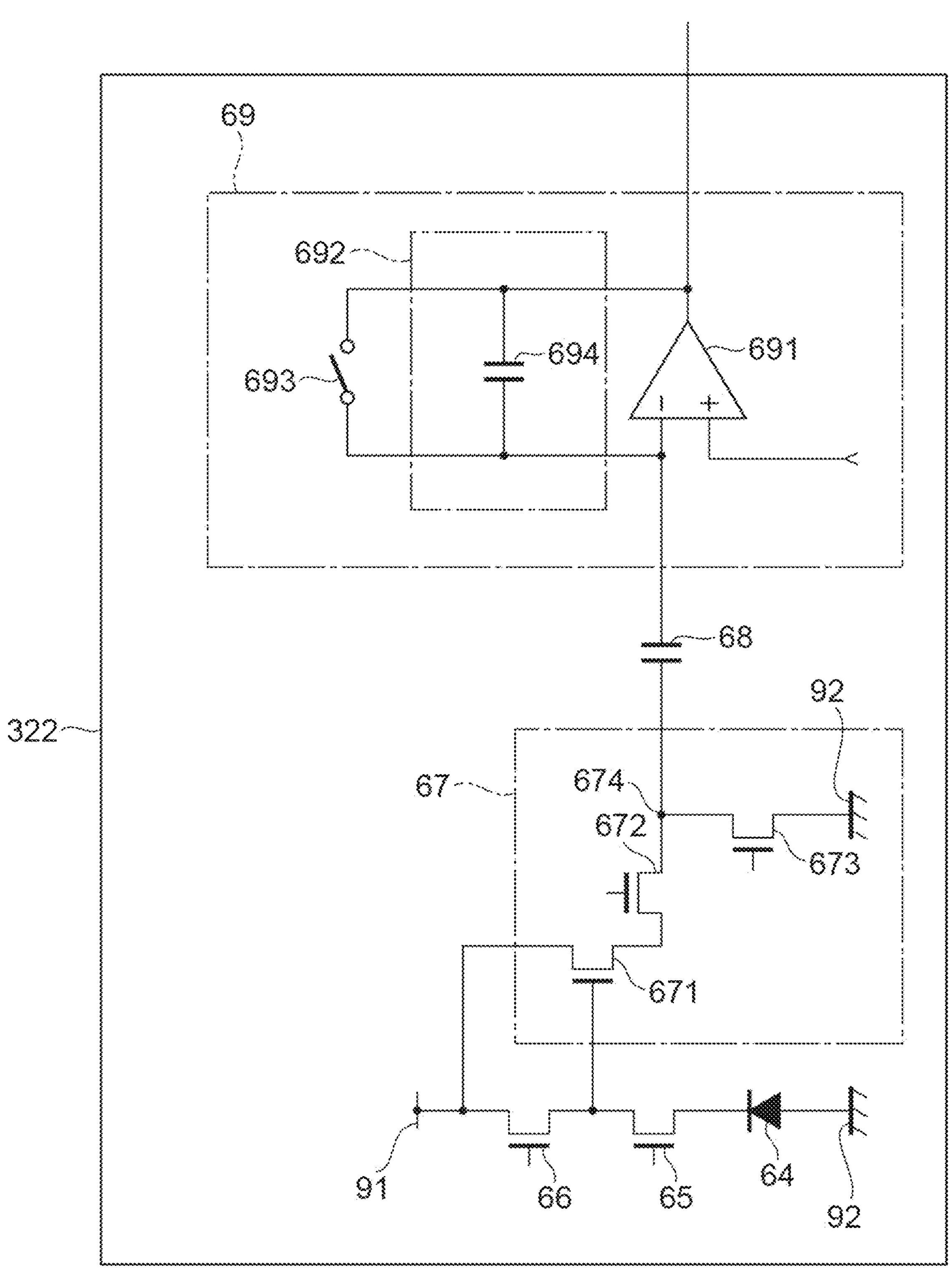
FIG. 7 is a diagram illustrating a configuration example of each pixel.

FIG. 7 is a diagram illustrating a configuration example of each of the pixels 322. Each of the pixels 322 includes a photodiode 64, a MOS transistor 65, a MOS transistor 66, and a source follower amplifier 67. The source follower amplifier 67 includes a MOS transistor 671, an operation control switch 672, and a current source 673.

The photodiode 64 generates a charge in response to the incidence of light. An anode of the photodiode 64 is connected to a second reference potential input end 92 to which a second reference potential (for example, ground potential) is input. A gate of the MOS transistor 671 is connected to a cathode of the photodiode 64 via the MOS transistor 65, and is connected, via the MOS transistor 66, to a first reference potential input end 91 to which a first reference potential (for example, power supply potential) is input. A drain of the MOS transistor 671 is connected to the first reference potential input end 91.

The operation control switch 672 is provided between a source of the MOS transistor 671 and a connecting node 674. The operation control switch 672 can be configured as a MOS transistor. The current source 673 is provided between the connecting node 674 and the second reference potential input end 92. The current source 673 may include a MOS transistor. The current source 673 may be configured as a resistor.

The on and off of each of the MOS transistors 65 and 66 is controlled by a control signal given from the sensor control unit 70. When the MOS transistor 66 is in an on state, a gate potential of the MOS transistor 671 is initialized. When the MOS transistors 65 and 66 are in an on state, the accumulation of charge in the junction capacitance of the photodiode 64 is initialized. When the MOS transistor 65 is in an on state and the MOS transistor 66 is in an off state, a gate potential of the MOS transistor 671 corresponds to the amount of incident light on the photodiode 64.

The on and off of the operation control switch 672 is also controlled by a control signal given from the sensor control unit 70. During a period when the operation control switch 672 is in an on state, a current flows from the first reference potential input end 91 to the second reference potential input end 92 via the MOS transistor 671, the operation control switch 672, and the current source 673. Accordingly, a voltage value corresponding to the gate potential of the MOS transistor 671 is output from the connecting node 674. On the other hand, during a period when the operation control switch 672 is in an off state, no current flows to the source follower amplifier 67, and the source follower amplifier 67 is in a power-down state.

Each of the pixels 322 further includes a capacitance element 68 and a charge amplifier 69. The charge amplifier 69 includes an amplifier 691, a capacitance unit 692, and a reset switch 693.

The amplifier 691 includes an inverting input terminal, a non-inverting input terminal, and an output terminal. A fixed bias potential is input to the non-inverting input terminal of the amplifier 691. The inverting input terminal of the amplifier 691 is connected to the connecting node 674 of the source follower amplifier 67 via the capacitance element 68.

The capacitance unit 692 is provided between the inverting input terminal and the output terminal of the amplifier 691. The capacitance unit 692 accumulates an amount of charge corresponding to the voltage value output from the source follower amplifier 67. The capacitance unit 692 includes a capacitance element 694.

The reset switch 693 is provided in parallel with the capacitance unit 692 between the inverting input terminal and the output terminal of the amplifier 691. When the reset switch 693 is in an on state, the accumulation of charge in the capacitance unit 692 is reset. When the reset switch 693 is in an off state, a voltage value corresponding to both the amount of charge accumulation in the capacitance unit 692 and a capacitance value of the capacitance unit 692 is output from the output terminal of the amplifier 691. The on and off of the reset switch 693 is controlled by a control signal given from the sensor control unit 70.

Referring again to FIG. 3, the holding members 318 and 319 are fixed to the housing 31 inside the housing 31. The holding members 318 and 319 are disposed on both side surfaces of the lens array 33 in the conveying direction D1, and hold the lens array 33 with the lens array 33 sandwiched therebetween. The lens array 33 is an example of a lens unit in the present embodiment.

Figure 8:
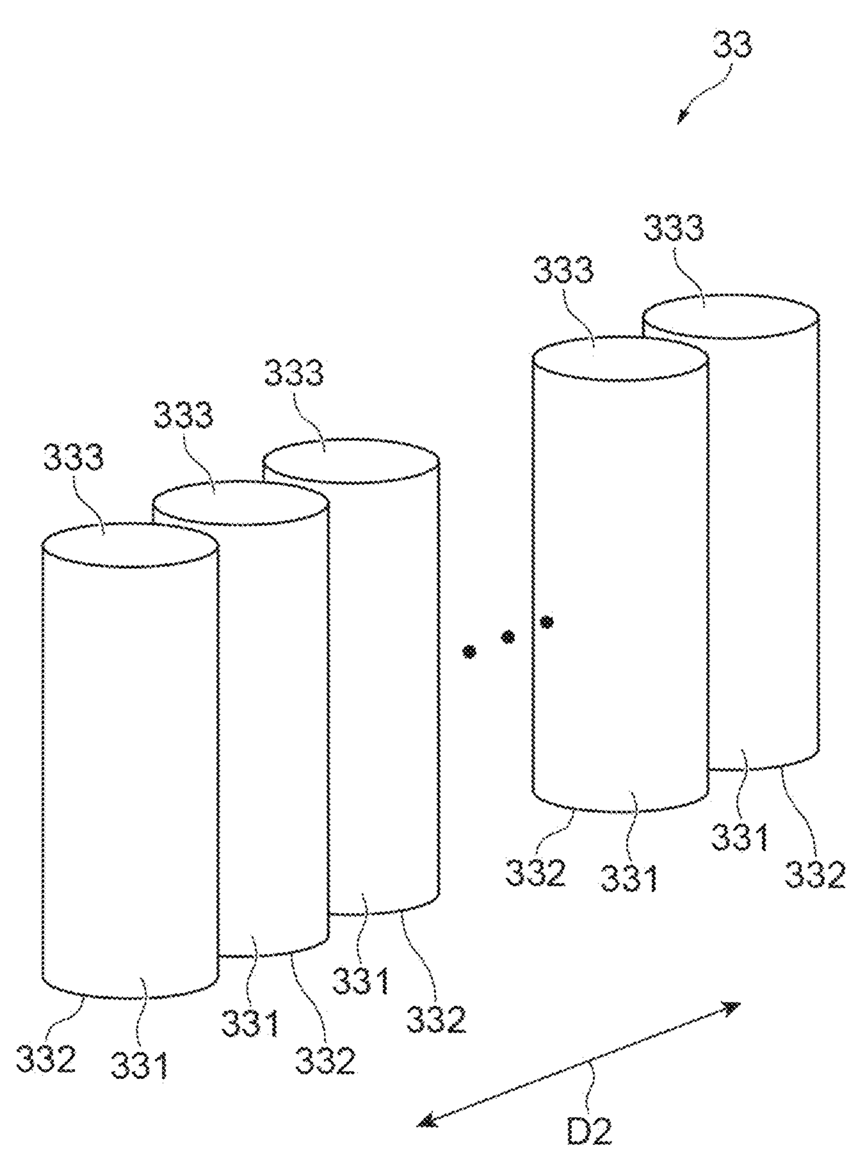
FIG. 8 is a perspective view schematically illustrating a lens array.
Figure 9:
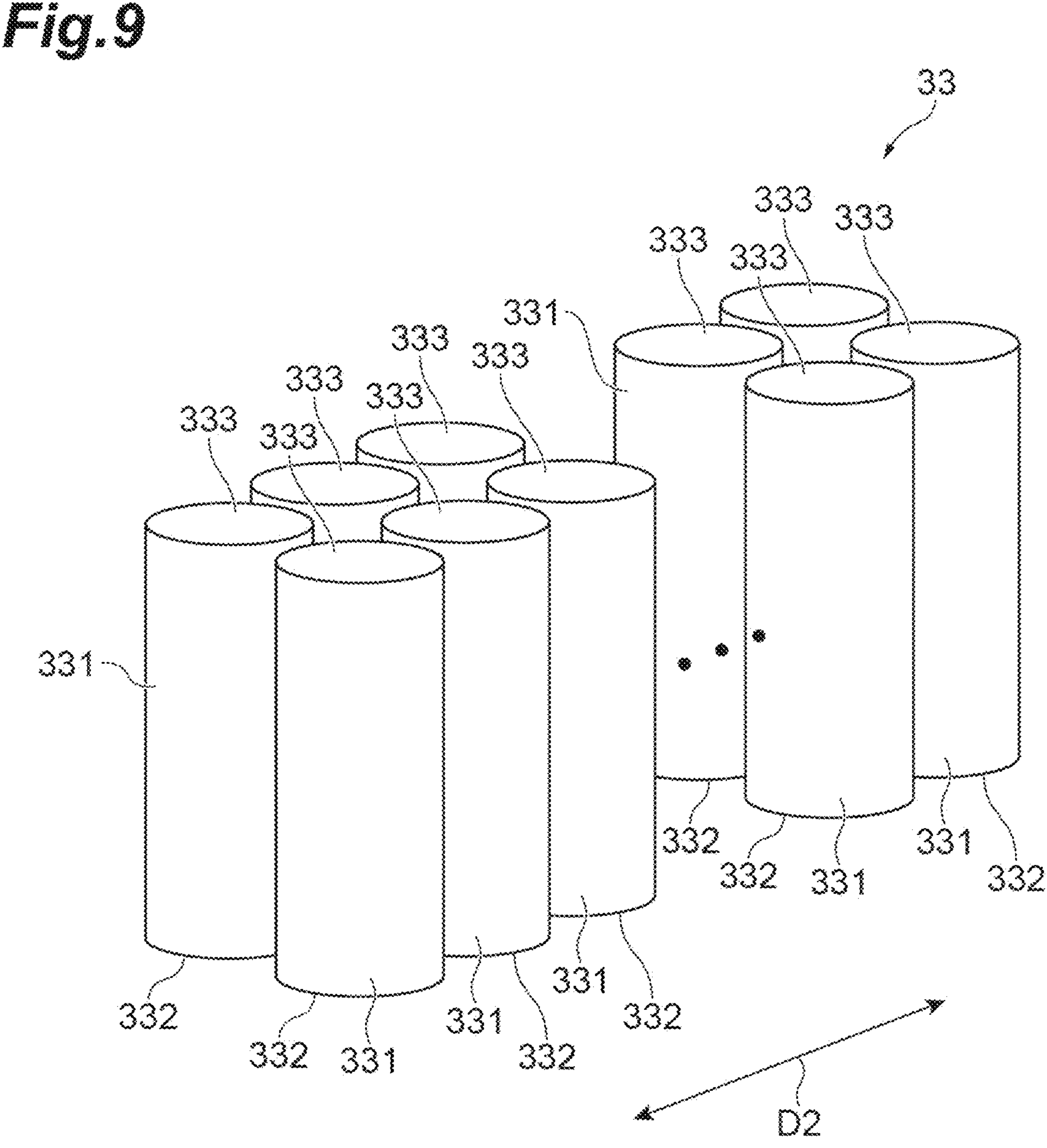
FIG. 9 is a perspective view schematically illustrating a lens array.

FIG. 8 is a perspective view schematically illustrating the lens array 33. The lens array 33 includes a plurality of lenses 331 arranged along the width direction D2. The magnification of each of the plurality of lenses 331 is equal magnification, and in one example, is 1×. When the magnification of each of the plurality of lenses 331 is equal magnification, the magnification does not need to be precisely 1×, and can be accepted as equal magnification if the magnification is, for example, 0.9× or more and 1.1× or less. Each of the plurality of lenses 331 is, for example, a rod lens made of glass. A light incident end surface 332 of each of the lenses 331 faces the first surface Ba (refer to FIG. 2) of the object B via the slit 315 (refer to FIG. 3) of the bottom plate 312. A distance between the light incident end surface 332 and the first surface Ba is, for example, 5 mm or more and 20 mm or less, and in one example, is 12 mm. The light-emitting end surface 333 of each of the lenses 331 faces the pixel unit 321 (refer to FIG. 4) of the image sensor 32. The lenses 331 does not necessarily correspond one-to-one to the pixels 322 of the pixel unit 321. The lens array 33 collects the emitted light Lb and forms an image of the emitted light Lb on the pixel unit 321 of the image sensor 32. A magnification of the image photographed on the image sensor 32 is the same as or smaller than a magnification of the object B that is a subject. Therefore, the collection efficiency of light can be increased compared to a high-magnification lens. Particularly, a plurality of rows (for example, two rows or three rows) of the lens arrays 33 as illustrated in FIG. 9 can further increase the collection efficiency of light than one row of the lens arrays 33 as illustrated in FIG. 8, compared to a high-magnification lens. An optical axis of the lens array 33 is along a normal line to one of the first surface Ba and the second surface Bb of the object B, the one facing the light detector 30. In the illustrated example, the optical axis of the lens array 33 is along a normal line to the first surface Ba. In other words, the optical axis of the lens array 33 is perpendicular to one of the first surface Ba and the second surface Bb of the object B, the one facing the light detector 30.

Figure 10:
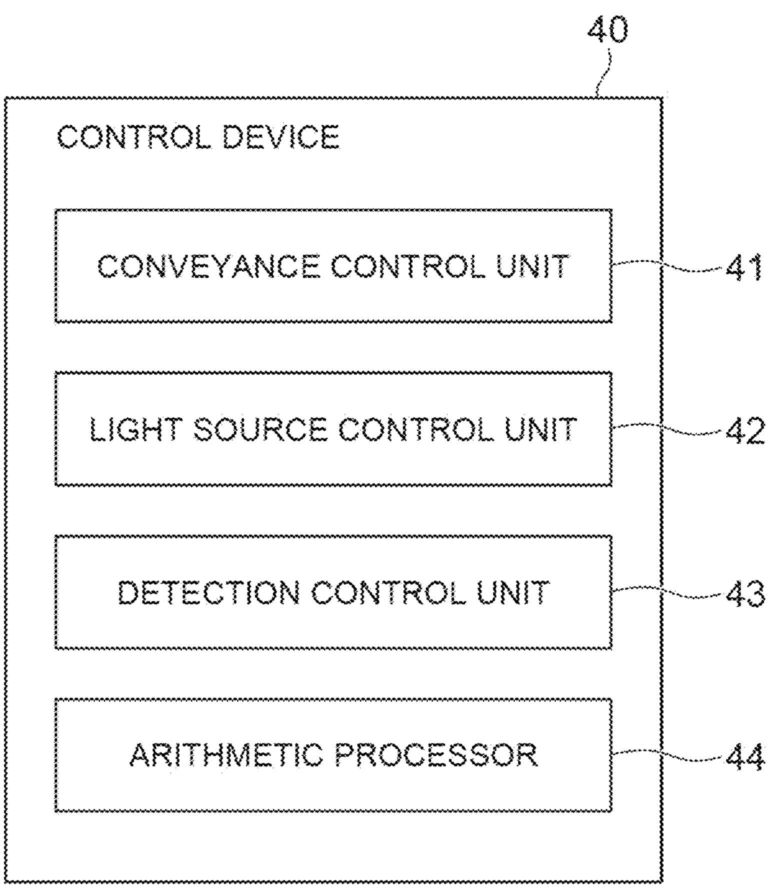
FIG. 10 is a diagram schematically illustrating a configuration of a control device.

The control device 40 is electrically connected to the conveyor 10, the light source 20, and the light detector 30. FIG. 10 is a diagram schematically illustrating a configuration of the control device 40. The control device 40 includes a conveyance control unit 41 that controls operation of the conveyor 10, such as conveying speed; a light source control unit 42 that controls operation of the light source 20; a detection control unit 43 that controls operation of the light detector 30; and an arithmetic processor 44. The arithmetic processor 44 receives image data as a detection result of the emitted light Lb from the light detector 30. The arithmetic processor 44 obtains information on a distribution of a relative thickness of the region R1 of the object B in the width direction D2 based on the image data. The control device 40 may be, for example, a personal computer; a smart device such as a smartphone or a tablet terminal; or a computer including a processor, such as a cloud server. At least one of the conveyance control unit 41, the light source control unit 42, and the detection control unit 43 may be configured as a computer separate from the arithmetic processor 44.

Figure 11:
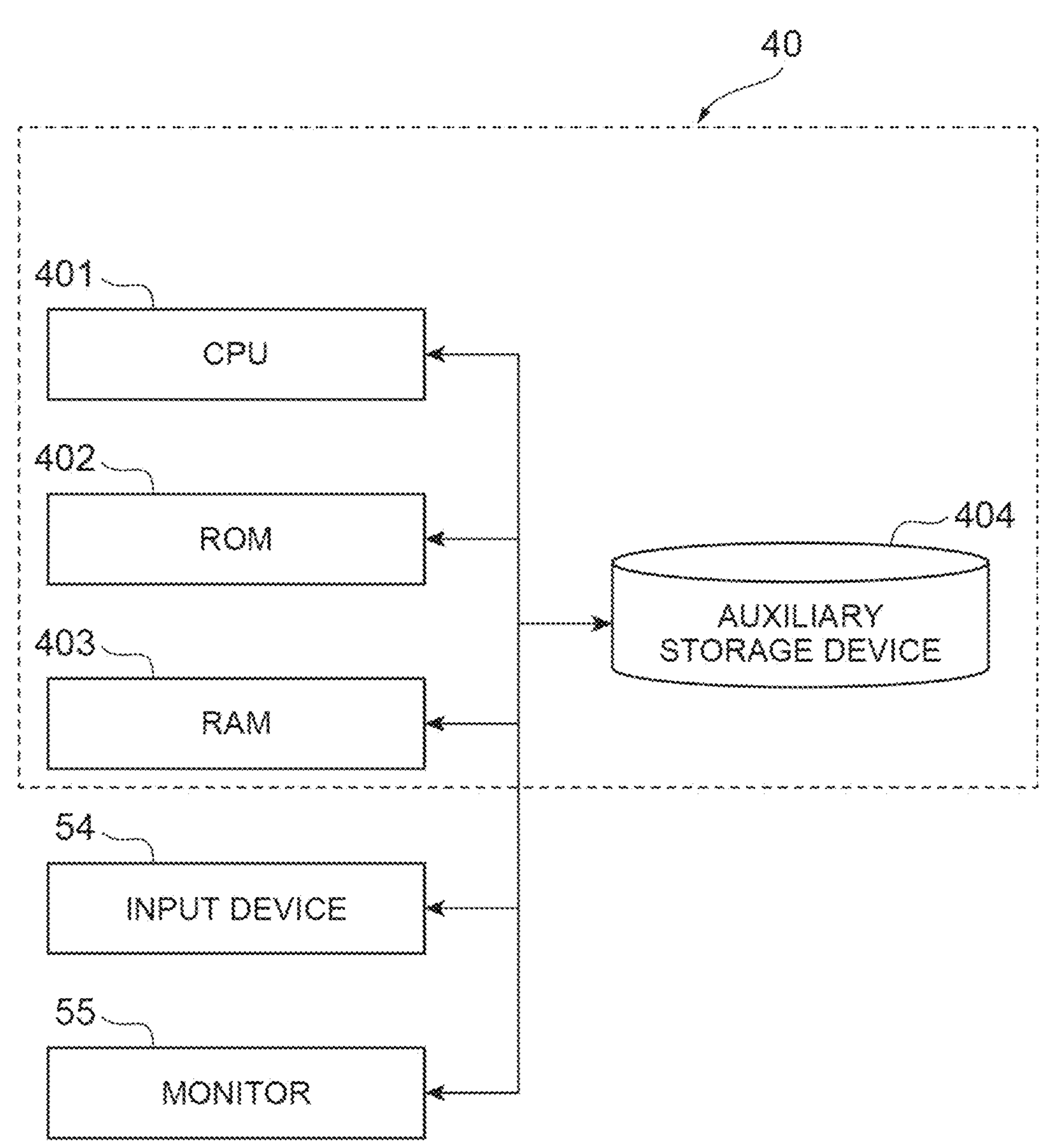
FIG. 11 is a diagram schematically illustrating a configuration example of hardware of the control device.

FIG. 11 is a diagram schematically illustrating a configuration example of hardware of the control device 40. As illustrated in FIG. 11, the control device 40 can be physically configured as a normal computer including a processor (CPU) 401, a main storage device such as a ROM 402 and a RAM 403, an auxiliary storage device 404 such as a hard disk, and the like. The processor 401 of the computer can realize each function of the control device 40 by reading out a program stored in the ROM 402 or the auxiliary storage device 404. Therefore, the program causes the processor 401 of the computer to operate as the conveyance control unit 41, the light source control unit 42, the detection control unit 43, and the arithmetic processor 44 in the control device 40. The storage device that stores the program may be a nontransitory recording medium. As an example of the recording medium, a recording medium such as a flexible disk, a CD, or a DVD, a recording medium such as a ROM, a semiconductor memory, a cloud server, or the like is provided.

The input device 54 is electrically connected to the control device 40. An operator inputs various settings related to the conveyance control unit 41, the light source control unit 42, the detection control unit 43, and the arithmetic processor 44 through the input device 54. The input device 54 can be, for example, a keyboard, a mouse, or a touch panel. The monitor 55 is electrically connected to the control device 40. The monitor 55 displays the information on the distribution of the relative thickness obtained by the arithmetic processor 44. The monitor 55 may be a touch screen including the input device 54 that is a touch panel.

The arithmetic processor 44 illustrated in FIG. 10 obtains information on the distribution of the relative thickness of the region R1 of the object B in the width direction D2 based on the image data. The information on the distribution of the relative thickness may be the distribution of the relative thickness, or may be any numerical value group related to the distribution of the relative thickness. For example, the information on the distribution of the relative thickness may be the image data itself. The reason is that the light intensity of the emitted light Lb represented in the image data is correlated with the thickness of the object B. A relative thickness refers to a relative value at another position in the width direction D2 when a value at a certain position is taken as a reference. Therefore, the arithmetic processor 44 may not necessarily accurately obtain an absolute thickness at each position in the width direction D2.

Figure 12:
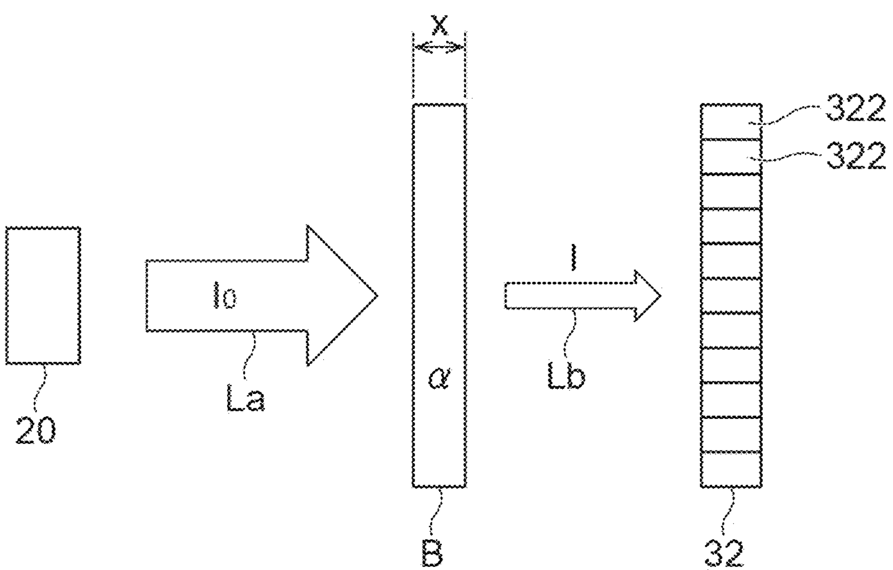
FIG. 12 is a view schematically illustrating a mode in which light is attenuated when transmitting through an object.

FIG. 12 is a view schematically illustrating a mode in which the light La is attenuated when transmitting through the object B. The thickness of each arrow in the figure represents a light intensity. As described above, the light La emitted from the light source 20 transmits through the object B to become the emitted light Lb. The emitted light Lb is detected by the image sensor 32. Here, when the light intensity of the light La is $I_0$, the light intensity of the emitted light Lb is I, the absorption coefficient of the object B is $\alpha$, and the thickness of the object B is x, Formula (1) below is established.

[Formula 1]

$$I = I_0 \cdot \exp(-\alpha x) \tag{1}$$

Figure 13:
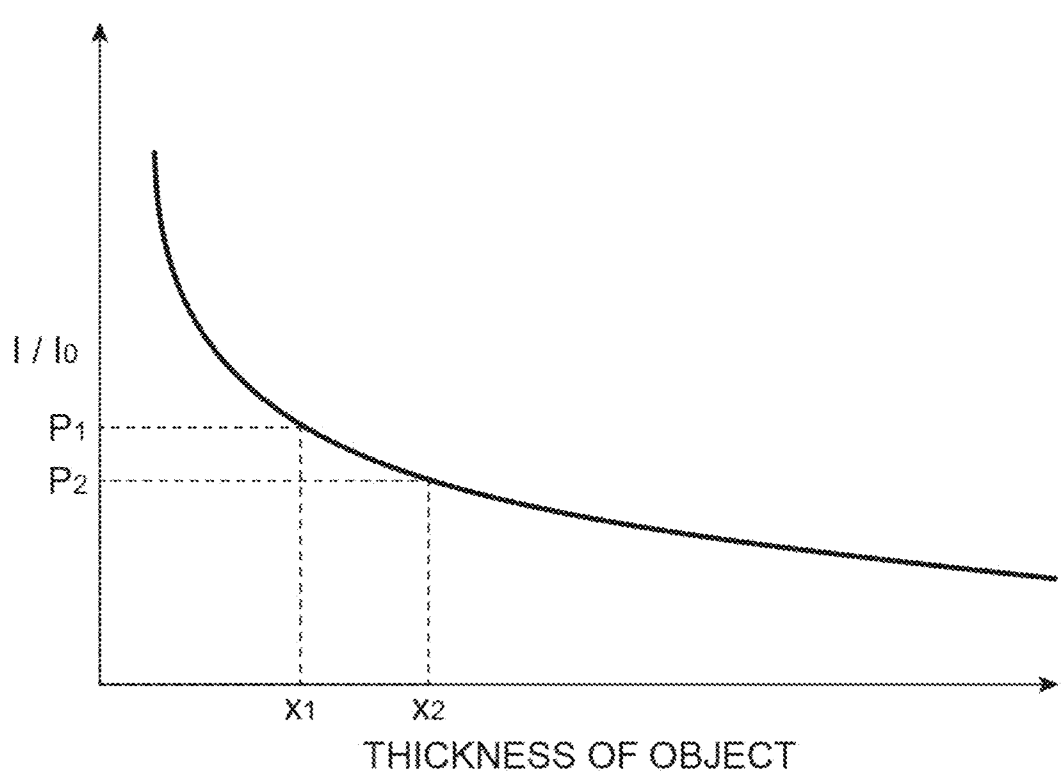
FIG. 13 is a graph representing a relationship shown in Formula (1).

Since the absorption coefficient $\alpha$ is a numerical value specific to a material for object B, the absorption coefficient $\alpha$ can be easily known. FIG. 13 is a graph representing a relationship shown in Formula (1). In FIG. 13, the vertical axis represents a ratio ($I/I_0$) of the light intensity I of the emitted light Lb to the light intensity $I_0$ of the light La, and the horizontal axis represents the thickness x of the object B. From this relationship, for example, when the value of the ratio ($I/I_0$) is $P_1$, the thickness x of the object B is $x_1$, and when the value of the ratio ($I/I_0$) is $P_2$, the thickness x of the object B is $x_2$, the thickness x can be unmistakably obtained based on the magnitude of the ratio ($I/I_0$). When the light intensity $I_0$ of the light La is known, the thickness x can be obtained based on the light intensity I of the emitted light Lb. Even when the light intensity $I_0$ of the light La is unknown, if irradiation intensities from the plurality of light-emitting elements of the light source 20 are uniform, the distribution of the relative thickness in the width direction D2 can be obtained.

Figure 14:
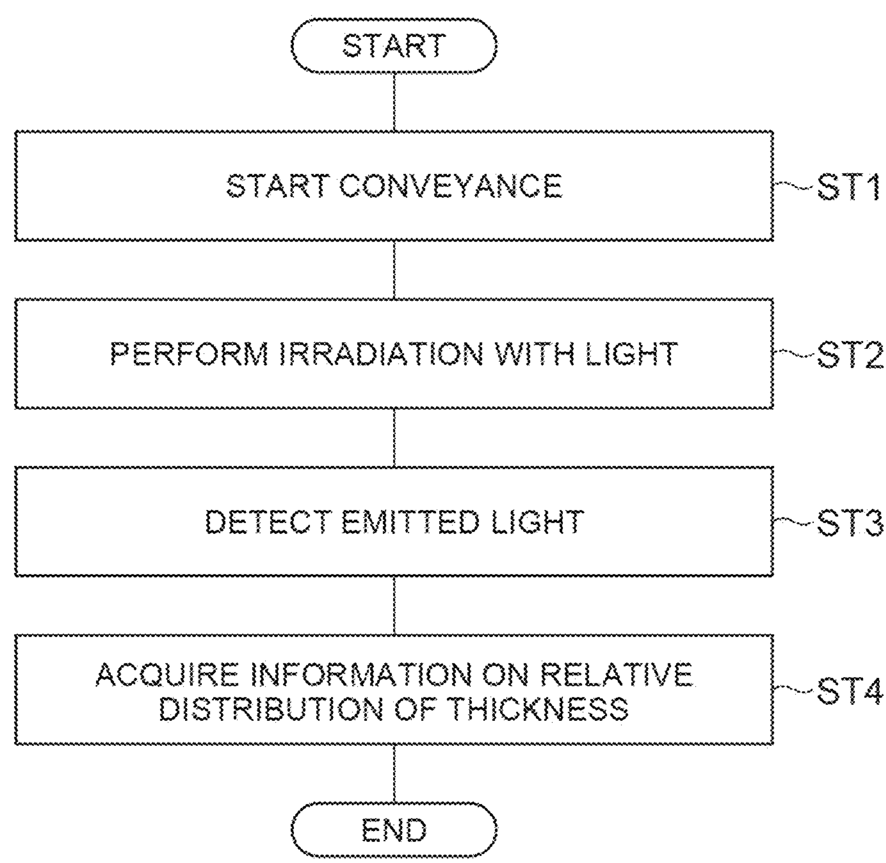
FIG. 14 is a flowchart illustrating a thickness-distribution measurement method according to one embodiment.

FIG. 14 is a flowchart illustrating the thickness-distribution measurement method according to the present embodiment. The thickness-distribution measurement method can be performed using the thickness-distribution measurement device 1A described above. In the thickness-distribution measurement method, in step ST1, the conveyance of the object B in the conveying direction D1 along the first surface Ba and the second surface Bb, the object B having the first surface Ba and the second surface Bb facing opposite to the first surface Ba, is started. In step ST2, the irradiation of the region R1 of the object B being conveyed with the light La, the region R1 extending in the width direction D2 intersecting the conveying direction D1, is started. In step ST3, the detection of the emitted light Lb from the object B irradiated with the light La is started. In step ST3, an image sensor 32 and the lens array 33 are used. As described above, the image sensor 32 includes the pixel unit 321 including the plurality of pixels 322 arranged at least in the width direction D2, and detects the intensity of the emitted light Lb for each of the pixels 322 to output image data. The lens array 33 includes the plurality of lenses 331 arranged in the width direction D2, and collects the emitted light Lb and forms an image of the emitted light Lb on the pixel unit 321 of the image sensor 32. In step ST4, information on the distribution of the relative thickness of the region R1 of the object B in the width direction D2 is obtained based on the detection result in step ST3.

Effects obtained by the thickness-distribution measurement device 1A and the thickness-distribution measurement method of the present embodiment described above will be described. When the light transmittance of the object B is uniform, the amount of light absorption inside the object B depends on the thickness of the object B. Therefore, by irradiating the region R1 of the object B with the light La, the region R1 extending in the width direction D2, and detecting the light intensity I of the emitted light Lb from the region R1, the distribution of the relative thickness of the object B in the width direction D2 of the object B can be measured. In addition, according to the thickness-distribution measurement device 1A and the thickness-distribution measurement method of the present embodiment, since the light intensity I of the emitted light Lb is detected using the image sensor 32 including the plurality of pixels 322 arranged in the width direction D2, the configuration can be simplified compared to a spectral interferometry in which a plurality of measurement units are disposed side by side in the width direction D2 of the object B.

Figure 15:
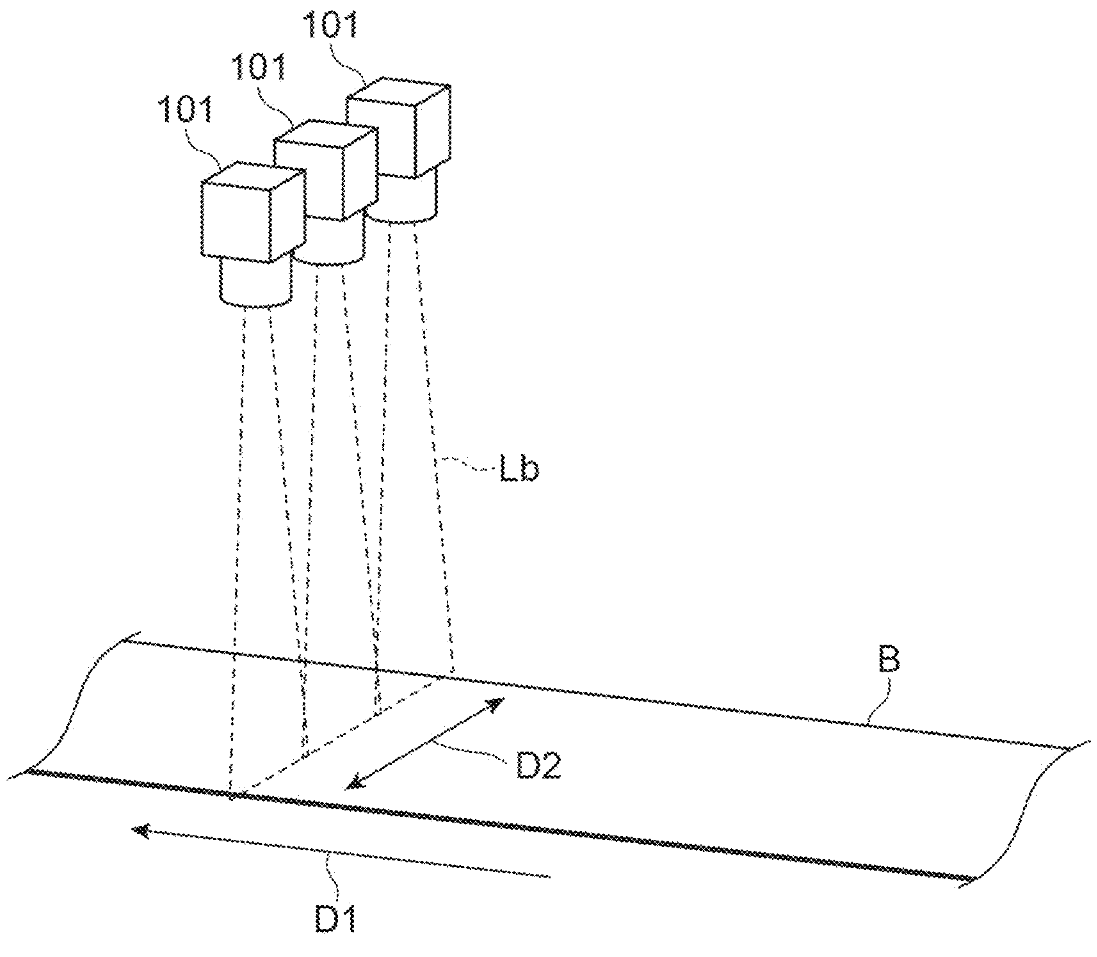
FIG. 15 is a perspective view illustrating a form in which a plurality of reduced optical measurement units are disposed side by side in a width direction of the object, as a comparative example.
Figure 16:
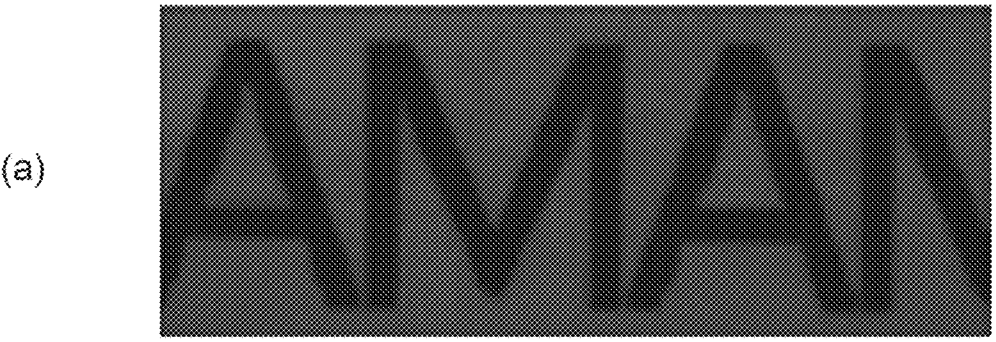
FIG. 16 Part (a) in FIG. 16 illustrates an example of an image acquired via a high-magnification lens. Part (b) in FIG. 16 illustrates an example of an image acquired via an equal-magnification lens.
Figure 16:
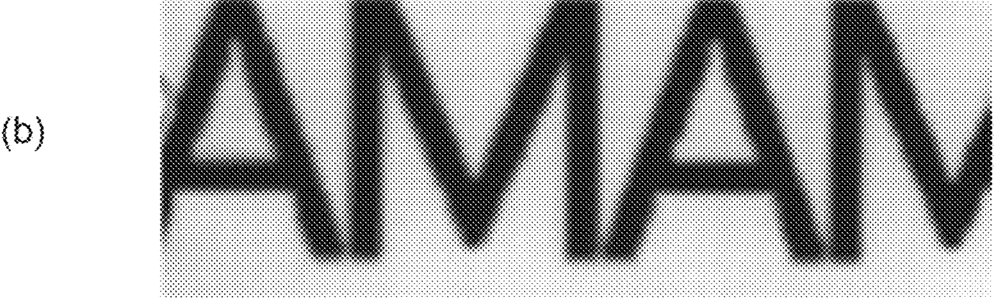

Here, FIG. 15 is a perspective view illustrating a form in which a plurality of reduced optical measurement units 101 are disposed side by side in the width direction D2 of the object B, as a comparative example. Each of the reduced optical measurement units 101 includes a high-magnification (namely, a magnification larger than equal magnification) lens. In this case, since the measurement units 101 are disposed at a large distance from the object B, the collection efficiency of the emitted light Lb is suppressed. Part (a) in FIG. 16 illustrates an example of an image with low collection efficiency of the emitted light Lb acquired via a high-magnification lens. In addition, in the high-magnification lens, since distortion between a center portion and a peripheral edge portion is large, a variation in the collection efficiency of the emitted light Lb in each of the measurement units 101 becomes large. Meanwhile, in the present embodiment, the emitted light Lb is collected and an image of the emitted light Lb is formed on the image sensor 32 using the lens array 33 including the plurality of lenses 331 having equal magnification and arranged in the width direction D2. Accordingly, the lens array 33 can be disposed in proximity to the object B to increase the collection efficiency of the emitted light Lb and to increase detection sensitivity. Part (b) in FIG. 16 illustrates an example of an image having high collection efficiency of the emitted light Lb acquired via an equal-magnification lens. This image is much clearer than the image illustrated in part (a) of FIG. 16. In addition, since distortion between a center portion and a peripheral edge portion of each of the lenses 331 is small, a variation in the collection efficiency of the emitted light Lb can be suppressed to a small level. From the above description, according to the present embodiment, even with a simple configuration, the distribution of the relative thickness can be measured with practical accuracy.

As in the present embodiment, the light source 20 may be disposed to face one of the first surface Ba and the second surface Bb, and the light detector 30 may be disposed to face the other of the first surface Ba and the second surface Bb. Furthermore, the emitted light Lb from the object B may be light that has transmitted through the object B. In such a manner, by disposing the light source 20 and the light detector 30 such that the object B is sandwiched between the light source 20 and the light detector 30, and detecting light that has transmitted through the object B, as the emitted light Lb from the object B, the light intensity I of the emitted light Lb greatly depends on the thickness of the object B. Therefore, the measurement accuracy of the distribution of the relative thickness can be further improved.

As in the present embodiment, the optical axis of the lens array 33 may be along the normal line to one of the first surface Ba and the second surface Bb, the one facing the light detector 30. In this case, the emitted light Lb emitted perpendicularly from a front surface of the object B is detected. Therefore, the influence of a polarization state on the light intensity I of the emitted light Lb can be avoided, and the measurement accuracy of the distribution of the relative thickness can be further improved. In this case, as the plurality of light-emitting elements included in the light source 20, it is preferable that light-emitting elements having high directivity are used such that the light La is incident on the object B as perpendicularly possible.

First Modification Example

Figure 17:
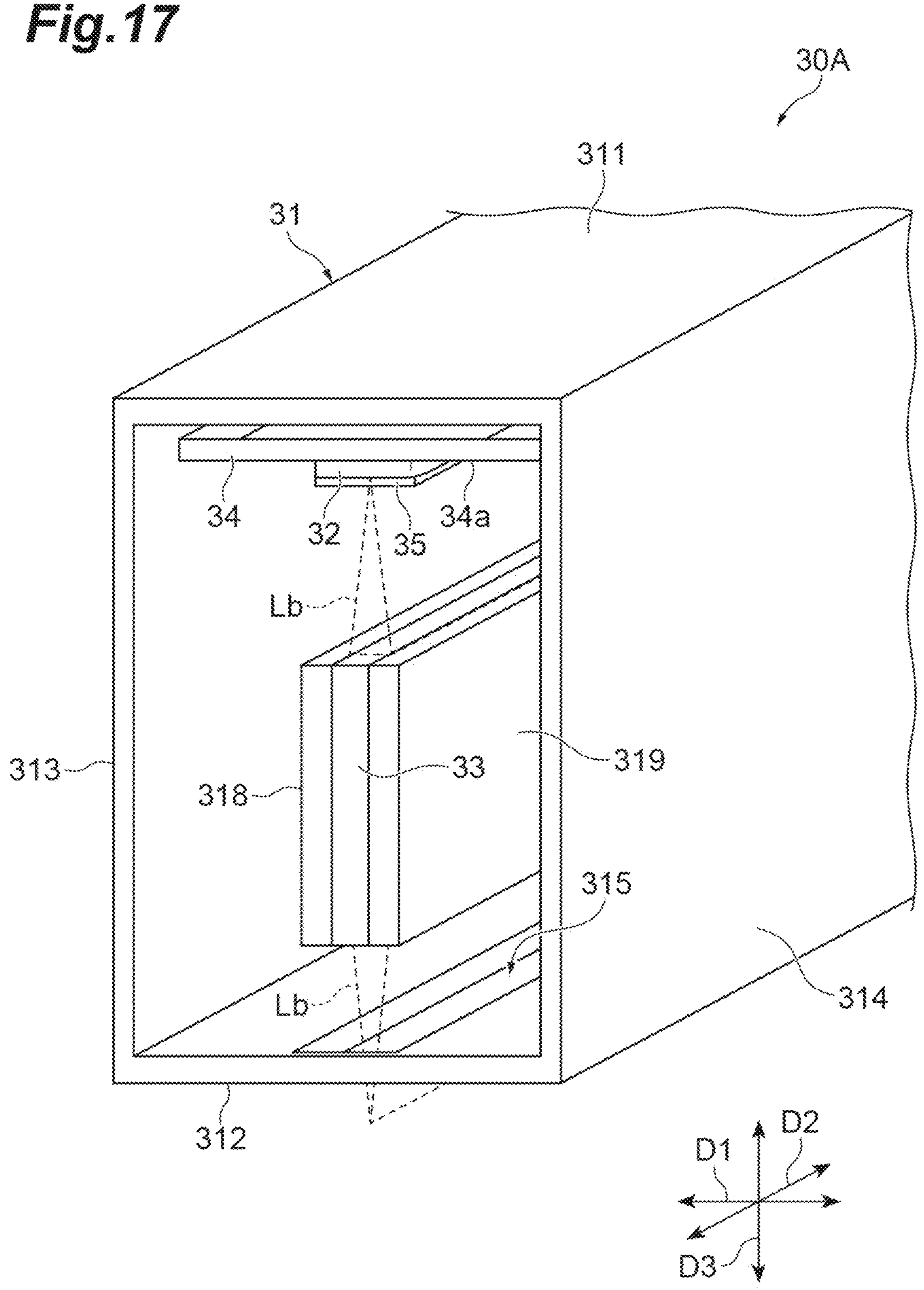
FIG. 17 is a cutout perspective view illustrating an internal structure of a light detector as a first modification example.

FIG. 17 is a cutout perspective view illustrating an internal structure of a light detector 30A as a first modification example. The light detector 30A of the present modification example further includes an optical filter unit 35 in addition to the configuration of the light detector 30 of the embodiment. The optical filter unit 35 is provided on the pixel unit 321 of the image sensor 32. The emitted light Lb from the object B passes through the optical filter unit 35, and then is incident on the pixel unit 321 of the image sensor 32.

Figure 18:
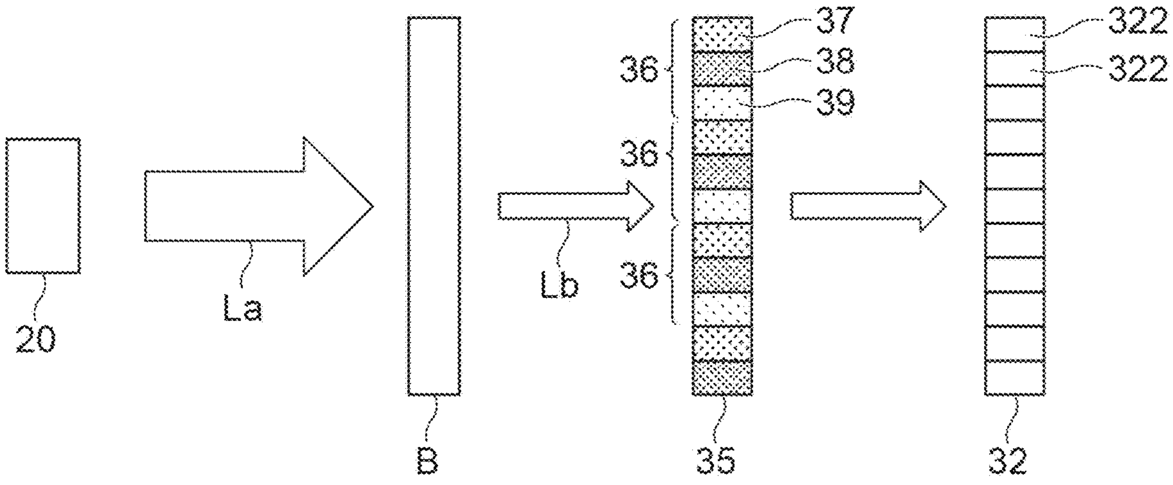
FIG. 18 is a view schematically illustrating a mode in which emitted light from the object passes through optical filter groups.

FIG. 18 is a view schematically illustrating a mode in which the emitted light Lb from the object B passes through the optical filter unit 35. As schematically illustrated in this figure, the optical filter unit 35 includes a plurality of optical filter groups 36 arranged along the width direction D2. Each of the optical filter groups 36 includes a plurality of optical filters 37 to 39. One of the optical filters 37 to 39 is an example of a first optical filter in the present modification example, and another one of the optical filters 37 to 39 is an example of a second optical filter in the present modification example. The optical filter 37 is provided on some pixels 322 among the plurality of pixels 322 of the image sensor 32. The optical filter 38 is provided on some other pixels 322 among the plurality of pixels 322 of the image sensor 32. The optical filter 39 is provided on the remaining pixels 322 among the plurality of pixels 322 of the image sensor 32. The optical filter 37 has a transmission wavelength band centered at a wavelength $\lambda_1$. The optical filter 38 has a transmission wavelength band centered at a wavelength $\lambda_2$ larger than the wavelength $\lambda_1$. The optical filter 39 has a transmission wavelength band centered at a wavelength $\lambda_3$ larger than the wavelength Au and the wavelength $\lambda_2$. The wavelength $\lambda_1$ is not included in the transmission wavelength bands of the optical filters 38 and 39. The wavelength $\lambda_2$ is not included in the transmission wavelength bands of the optical filters 37 and 39. The wavelength $\lambda_3$ is not included in the transmission wavelength bands of the optical filters 37 and 38.

A wavelength component of the emitted light Lb from the object B, the wavelength component being centered at the wavelength $\lambda_1$, passes through the optical filter 37, and is incident on a pixel 322. A wavelength component centered at the wavelength $\lambda_2$ passes through the optical filter 38, and is incident on another pixel 322. A wavelength component centered at the wavelength $\lambda_3$ passes through the optical filter 39, and is incident on yet another pixel 322. In this way, the light intensity I of the emitted light Lb is detected for each wavelength.

Figure 19:
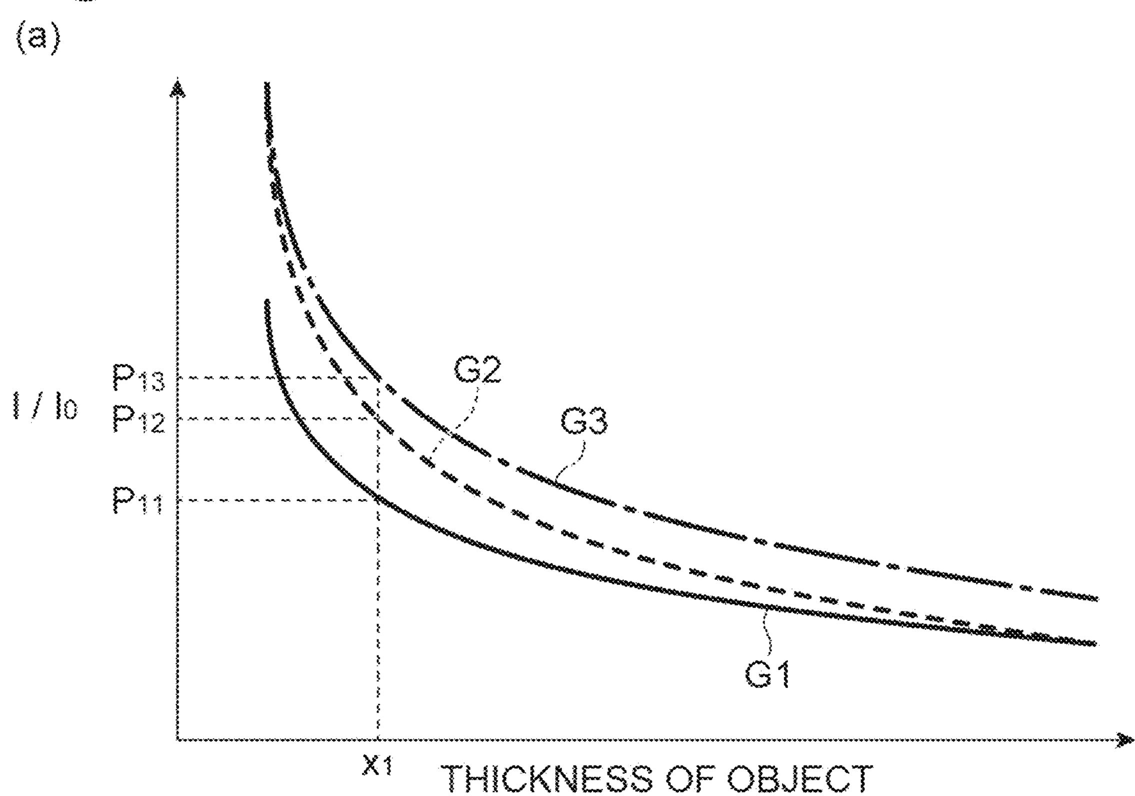
FIG. 19 Parts (a) and (b) in FIG. 19 are graphs representing the relationship shown in Formula (1) for each wavelength.
Figure 19:
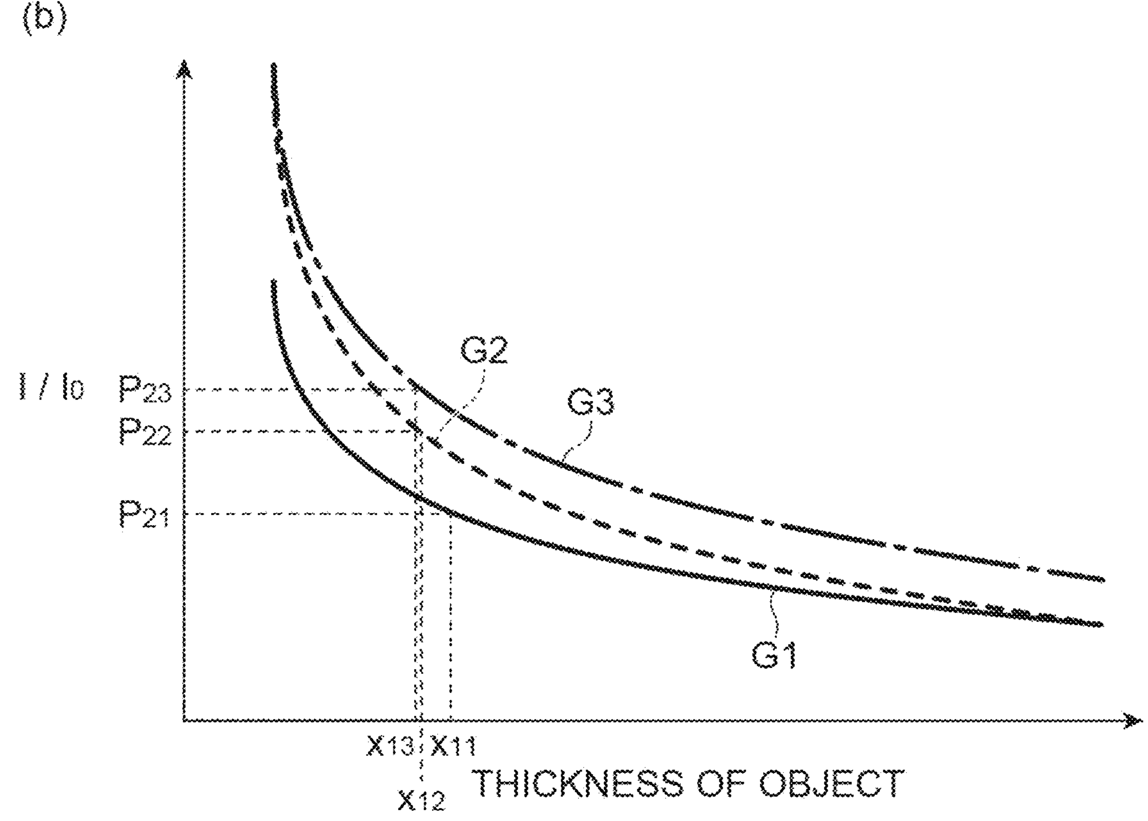

Parts (a) and (b) in FIG. 19 are graphs representing the relationship shown in Formula (1) for each wavelength. In the figures, a curve G1 corresponds to the wavelength $\lambda_1$, a curve G2 corresponds to the wavelength $\lambda_2$, and a curve G3 corresponds to the wavelength 23. The curves G1 to G3 in part (b) of FIG. 19 are the same as the curves G1 to G3 in part (a) of FIG. 19. Since the absorption coefficient $\alpha$ depends on the wavelength, the curves differ for each wavelength in such a manner. In this example, the larger the wavelength is, the smaller the absorption coefficient $\alpha$ is, namely, the larger the light transmittance is. In this case, it is assumed that the light intensity of the light La has a predetermined magnitude $I_0$ and is known. In this case, as illustrated in part (a) of FIG. 19, for a certain thickness $x_1$ of the object B, the value of the ratio $(I/I_0)$ is $P_{11}$ at the wavelength $\lambda_1$, $P_{12}$ at the wavelength $\lambda_2$, and $P_{13}$ at the wavelength 23. Furthermore, the arithmetic processor 44 calculates the thickness of the object B to be $x_1$ regardless of the value of the ratio $(I/I_0)$ at any wavelength. Thereafter, it is assumed that the light intensity of the light La has varied from the predetermined magnitude $I_0$. In this case, since the light intensity I of the emitted light Lb varies, the value of the ratio $(I/I_0)$ changes from $P_{11}$ to $P_{21}$ at the wavelength $\lambda_1$, changes from $P_{12}$ to $P_{22}$ at the wavelength $\lambda_2$, and changes $P_{13}$ to $P_{23}$ at the wavelength $\lambda_3$ as illustrated in part (b) of FIG. 19. As a result, the calculation results of the thickness of the object B by the arithmetic processor 44 differ for each wavelength, namely, $x_{11}$ at the wavelength $\lambda_1$, $x_{12}$ at the wavelength $\lambda_2$, and $x_{13}$ at the wavelength $\lambda_3$. From this finding, the operator can know that the light intensity of the light La output from the light source 20 has varied over time, and can know the timing to adjust the light intensity of the light La or the timing to adjust parameters of the formula.

In the above description, a case where each of the optical filter groups 36 includes three optical filters 37 to 39 has been provided as an example; however, the number of the optical filters of each of the optical filter groups 36 may be 2 or may be 4 or more. When each of the optical filter groups 36 includes only two optical filters 37 and 38, the optical filter 37 is provided on some pixels 322 among the plurality of pixels 322 of the image sensor 32, and the optical filter 38 is provided on the remaining pixels 322 among the plurality of pixels 322 of the image sensor 32.

Second Modification Example

Figure 20:
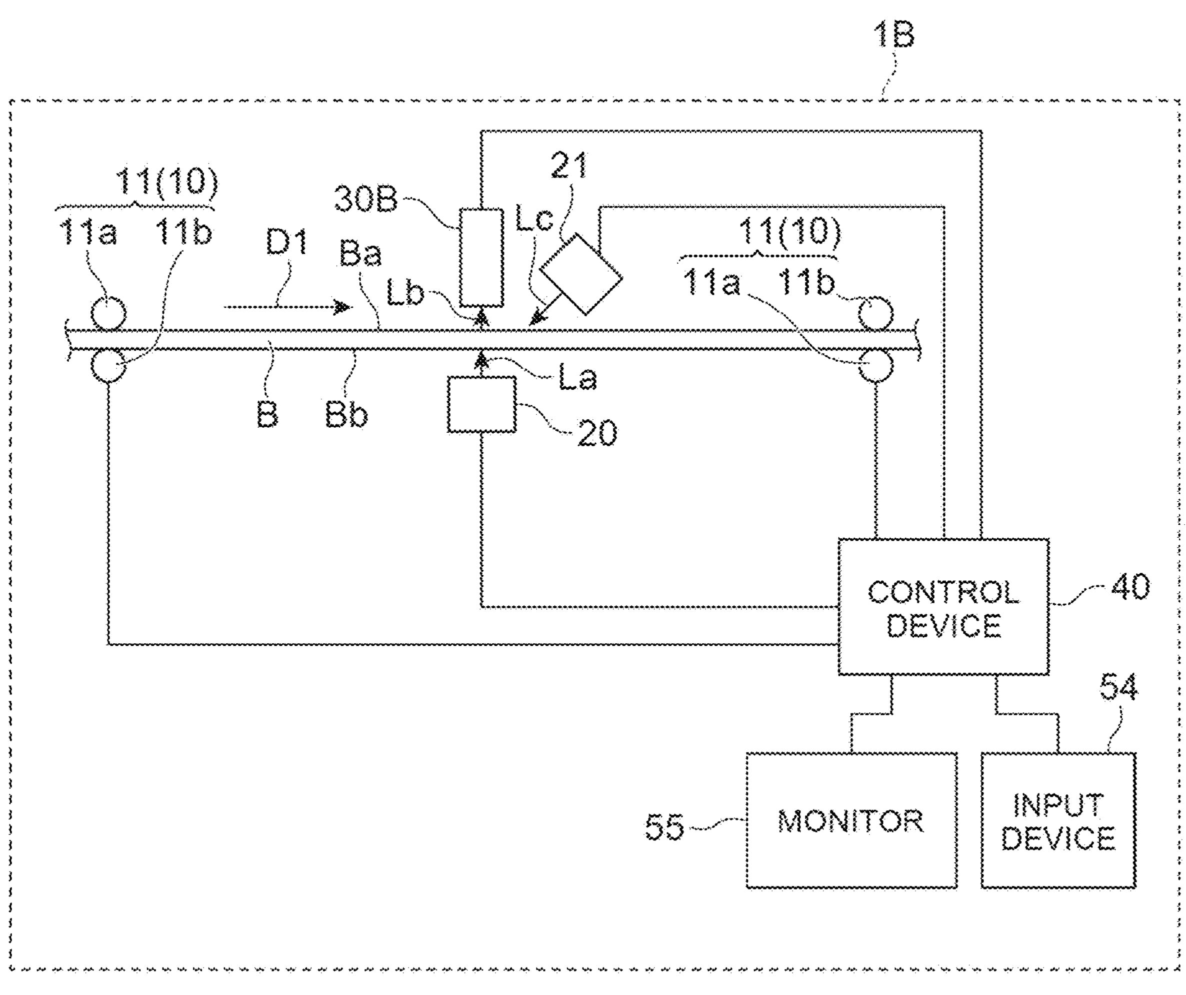
FIG. 20 is a view schematically illustrating a configuration of a thickness-distribution measurement device according to a second modification example.

FIG. 20 is a view schematically illustrating a configuration of a thickness-distribution measurement device 1B according to a second modification example. The thickness-distribution measurement device 1B of the present modification example further includes a light source 21 separate from the light source 20, in addition to the configuration of the thickness-distribution measurement device 1A of the embodiment. The light source 21 is disposed at a position facing a surface (in the illustrated example, the first surface Ba) opposite to one of the first surface Ba and the second surface Bb of the object B, the one facing the light source 20. The light source 21 irradiates the region R1 or another region of the object B being conveyed with light Lc, the another region extending in the width direction D2 (refer to FIG. 2). Similarly to the region R1, the another region extends from the one end edge to the other end edge of the object B in the width direction D2. The light source 21 has, for example, a configuration in which a plurality of light-emitting elements are arranged along the width direction D2. A light-emitting diode (LED) is provided as an example of the light-emitting element; however, the light-emitting element is not limited thereto. The emission wavelengths and the emission intensities of the plurality of light-emitting elements are uniform among the plurality of light-emitting elements. The light source 21 outputs the light Lc that is continuous light. A wavelength of the light Lc may be included in the visible range, or may be included in the near-infrared range. A light intensity of the light Lc may be equal to or different from the light intensity of the light La. The wavelength of the light Lc may be equal to or different from the wavelength of the light La.

The thickness-distribution measurement device 1B of the present modification example includes a light detector 30B instead of the light detector 30 of the embodiment. The light detector 30B differs from the light detector 30 of the embodiment in that the image sensor 32 is configured to be able to switch a gain value for amplifying signals output from a plurality of pixels, and is identical to the light detector 30 of the embodiment in other respects. The light detector 30B detects the emitted light Lb from the object B irradiated with the light La by the light source 20, and detects the emitted light Lb from the object B irradiated with the light Lc by the light source 21. The irradiation timing of the light La and the irradiation timing of the light Lc are controlled by the light source control unit 42 (refer to FIG. 10) of the control device 40, and are different from each other.

The gain value of the image sensor 32 is controlled to be different between when irradiation with the light La from the light source 20 is performed and when irradiation with the light Lc from the light source 21 is performed. Namely, when the light intensity I of the emitted light Lb when irradiation with the light La is performed is larger than the light intensity I of the emitted light Lb when irradiation with the light Lc is performed, the gain value of the image sensor 32 when irradiation with the light La from the light source 20 is performed is controlled to be smaller than the gain value of the image sensor 32 when irradiation with the light Lc is performed. When the light intensity I of the emitted light Lb when irradiation with the light La is performed is smaller than the light intensity I of the emitted light Lb when irradiation with the light Lc is performed, the gain value of the image sensor 32 when irradiation with the light La from the light source 20 is performed is controlled to be larger than the gain value of the image sensor 32 when irradiation with the light Lc is performed. Accordingly, the variation range of the magnitude of a signal output from the image sensor 32 can be reduced.

Figure 21:
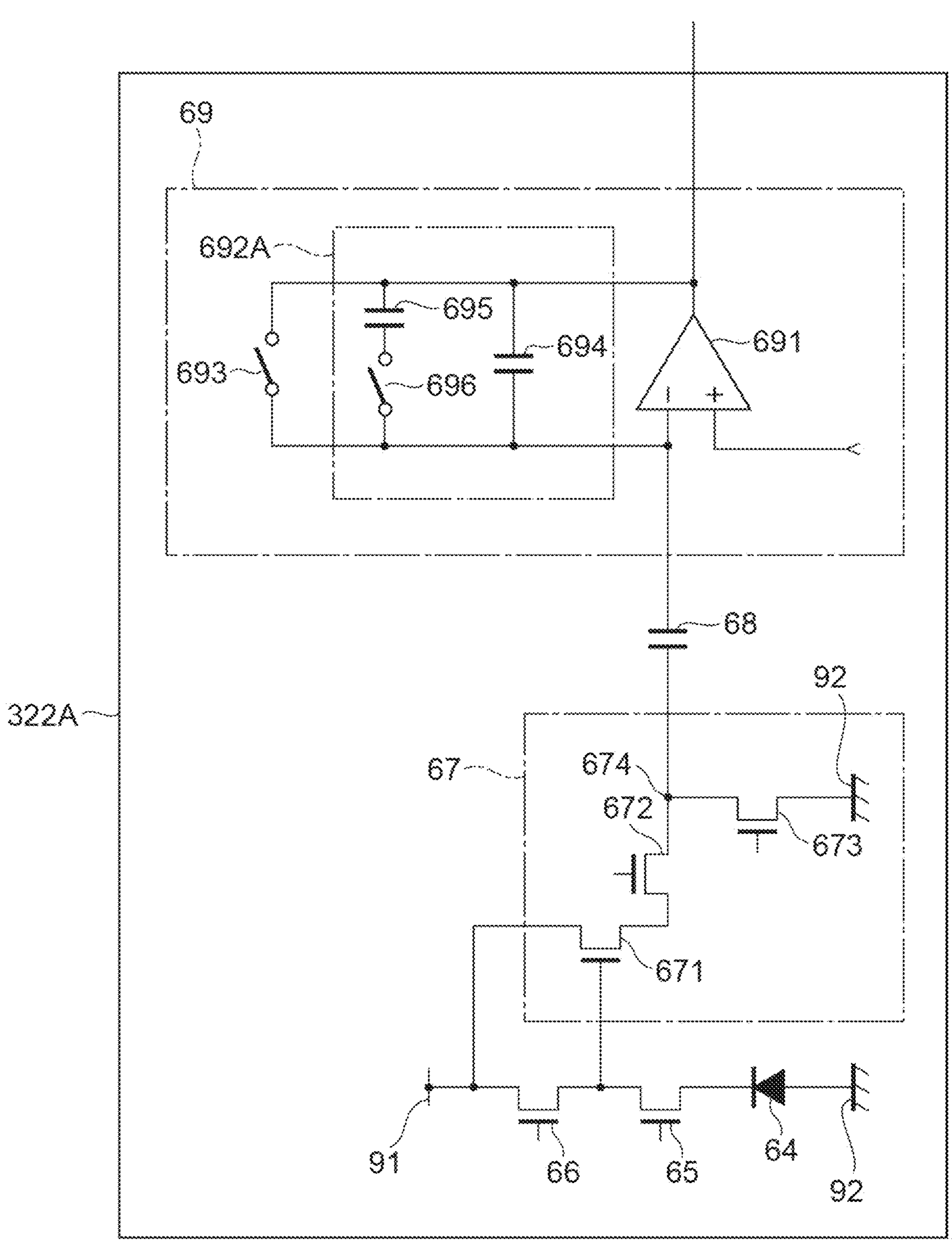
FIG. 21 is a diagram illustrating a configuration example of each pixel of the image sensor of the second modification example.

FIG. 21 is a diagram illustrating a configuration example of each of pixels 322A of the image sensor 32 of the present modification example. The pixel 322A has the same configuration and function as the pixel 322 of the embodiment except for the following respects. Namely, the pixel 322A of the present modification example includes a capacitance unit 692A instead of the capacitance unit 692 (refer to FIG. 7) of the embodiment. The capacitance unit 692A is provided between the inverting input terminal and the output terminal of the amplifier 691. The capacitance unit 692A accumulates an amount of charge corresponding to a voltage value output from the source follower amplifier 67. The capacitance value of the capacitance unit 692A is variable. The capacitance unit 692A includes a capacitance element 694, a capacitance element 695, and a switch 696, so that the capacitance value can be made variable. The capacitance element 695 and the switch 696 are connected in series with each other. A series circuit composed of the capacitance element 695 and the switch 696 and the capacitance element 694 are provided in parallel with each other. Depending on whether the switch 696 is in an on state or an off state, the capacitance value of the capacitance unit 692A differs, and the gain (gain value) of the charge amplifier 69 differs. The on and off of the switch 696 is controlled by a control signal given from the sensor control unit 70.

As in the present modification example, the image sensor 32 may be configured to be able to switch a gain value for amplifying signals output from the plurality of pixels 322A. In this case, even when the light intensity I of the emitted light Lb changes, the distribution of the relative thickness can be measured without replacing the image sensor 32. By setting the gain value to an appropriate value, the S/N ratio is improved, and the measurement accuracy of the distribution of the relative thickness is improved.

As in the present modification example, the light source 21 separate from the light source 20 may be provided, and the light source 21 may be disposed at a position facing a surface opposite to one of the first surface Ba and the second surface Bb of the object B, the one facing the light source 20, and may irradiate a region of the object B being conveyed with the light Lc, the region extending along the width direction D2. Furthermore, the light detector 30B may further detect the emitted light Lb from the object B irradiated with the light Lc by the light source 21, in addition to the emitted light Lb from the object B irradiated with the light La by the light source 20. In this case, the emitted light Lb from a surface irradiated with light and the emitted light Lb from a surface opposite to the surface irradiated with the light can be detected using one thickness-distribution measurement device 1B. Therefore, the information on the distribution of the relative thickness can be obtained based on the detection results of these emitted lights Lb, so that the measurement accuracy of the distribution of the relative thickness can be further improved.

Third Modification Example

Figure 22:
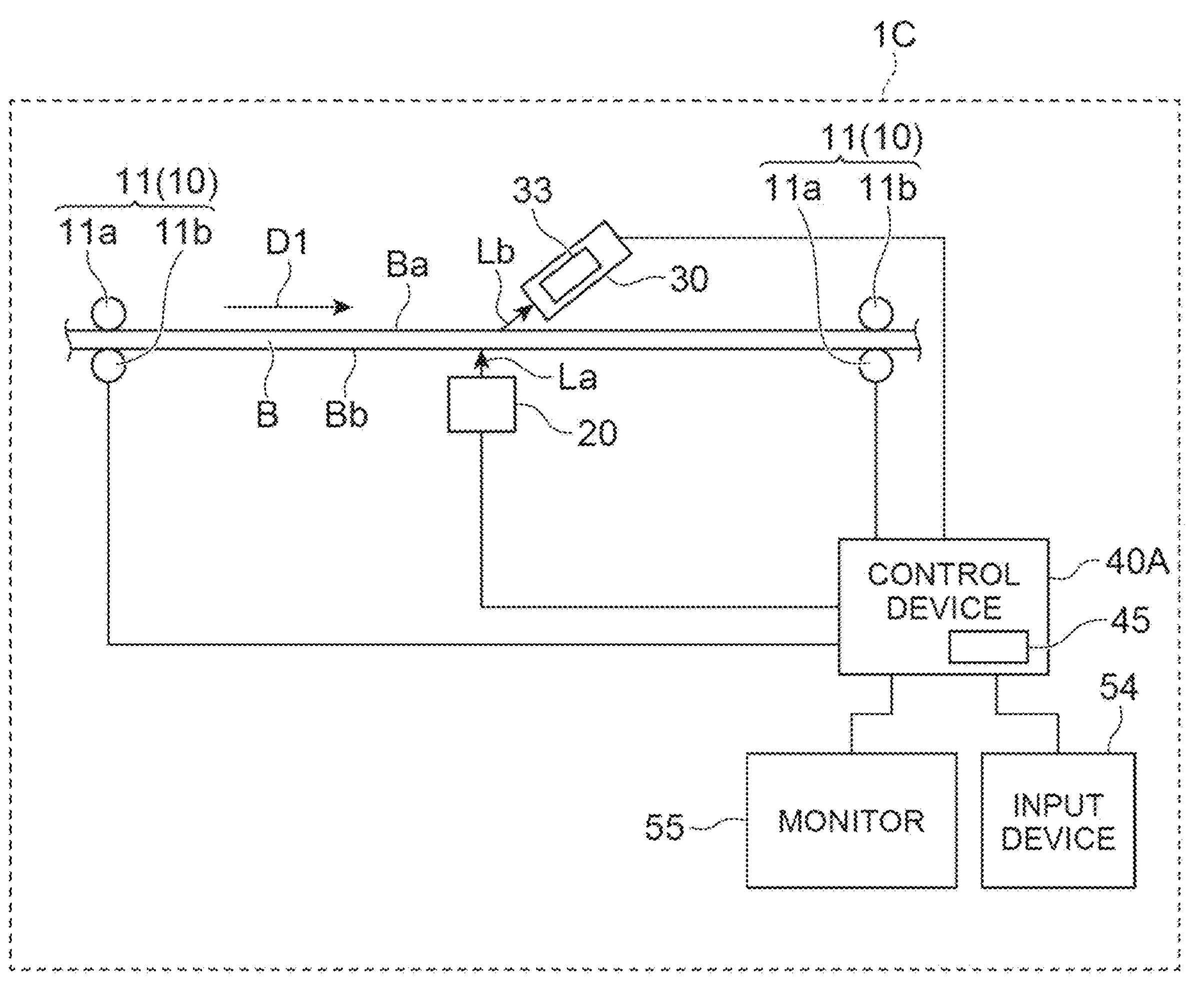
FIG. 22 is a view schematically illustrating a configuration of a thickness-distribution measurement device according to a third modification example.

FIG. 22 is a view schematically illustrating a configuration of a thickness-distribution measurement device 1C according to a third modification example. The thickness-distribution measurement device 1C of the present modification example differs from the thickness-distribution measurement device 1A of the embodiment in that the optical axis of the lens array 33 of the light detector 30 is inclined. Further, the thickness-distribution measurement device 1C of the present modification example includes a control device 40A instead of the control device 40 of the embodiment. The control device 40A further includes a scratch detection unit 45 that detects scratches that have occurred on the front surface of the object B, in addition to the conveyance control unit 41, the light source control unit 42, the detection control unit 43, and the arithmetic processor 44 of the control device 40 of the embodiment.

Specifically, the optical axis of the lens array 33 in the present modification example is inclined with respect to a normal line to one (in the illustrated example, the first surface Ba) of the first surface Ba and the second surface Bb of the object B, the one facing the light detector 30. An inclination angle of the optical axis of the lens array 33 with respect to the normal line is, for example, 5° or more, and may be 45° or more. The inclination angle may be 80° or less. The larger the inclination angle of the optical axis of the lens array 33 with respect to the normal line is, the easier the detection of scratches to be described later becomes. In the same manner as in the embodiment, the light detector 30 detects the emitted light Lb from the object B irradiated with the light La. Since a light emission direction from the light source 20 is perpendicular to the second surface Bb of the object B, the optical axis of the lens array 33 is also inclined with respect to the light emission direction of the light source 20. The arithmetic processor 44 obtains information on the distribution of the relative thickness of the object B in the width direction D2 in the same manner as in the embodiment, based on image data obtained by the image sensor 32.

Figure 23:
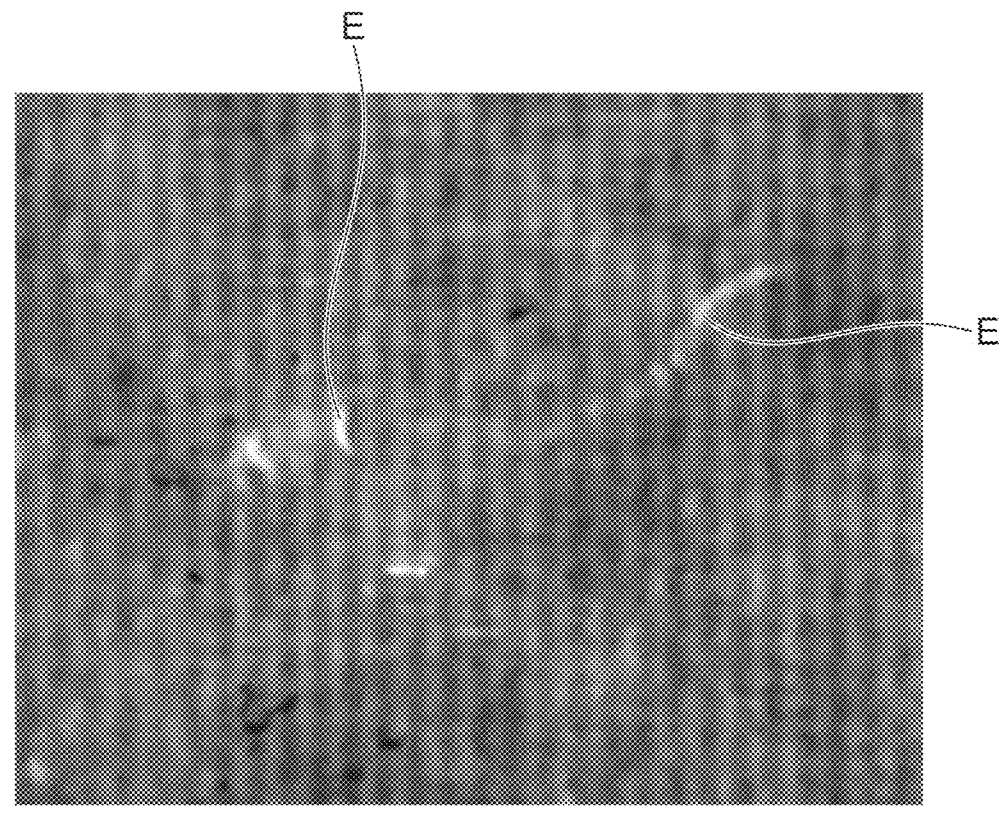
FIG. 23 illustrates one example of image data obtained by the image sensor.

In addition, in the present modification example, the scratch detection unit 45 detects scratches that have occurred on the front surface of the object B, based on the image data obtained by the image sensor 32. FIG. 23 illustrates one example of the image data obtained by the image sensor 32. This image data includes an image of a scratch E that has occurred on the front surface of the object B. The scratch E that has occurred on the front surface of the object B appears more clearly in the image data by inclining the optical axis of the lens array 33 with respect to the normal line to the surface of the object B facing the light detector 30, and detecting scattered light. Therefore, according to the present modification example, the detection of scratches existing on the front surface of the object B can be performed at the same time with the measurement of the distribution of the relative thickness. The thickness-distribution measurement device 1C may include the control device 40 that does not include the scratch detection unit 45, instead of the control device 40A including the scratch detection unit 45. Namely, the optical axis of the lens array 33 may be inclined even when the thickness-distribution measurement device 1C is only for the purpose of obtaining information on the distribution of the relative thickness of the object B in the width direction D2 without performing the detection of the scratch E.

In the present modification example, the acquisition of information on the distribution of the relative thickness and the detection of the scratch E that has occurred on the front surface of the object B are performed using one light detector 30; however, the separate light detector 30 may be used for each of the acquisition and the detection. In that case, the optical axis of the lens array 33 of the light detector 30 for acquiring information on the distribution of the relative thickness may be set to be parallel to the normal line to the surface of the object B, and the optical axis of the lens array 33 of the light detector 30 for detecting the scratch E may be inclined with respect to the normal line to the surface of the object B.

Fourth Modification Example

Figure 24:
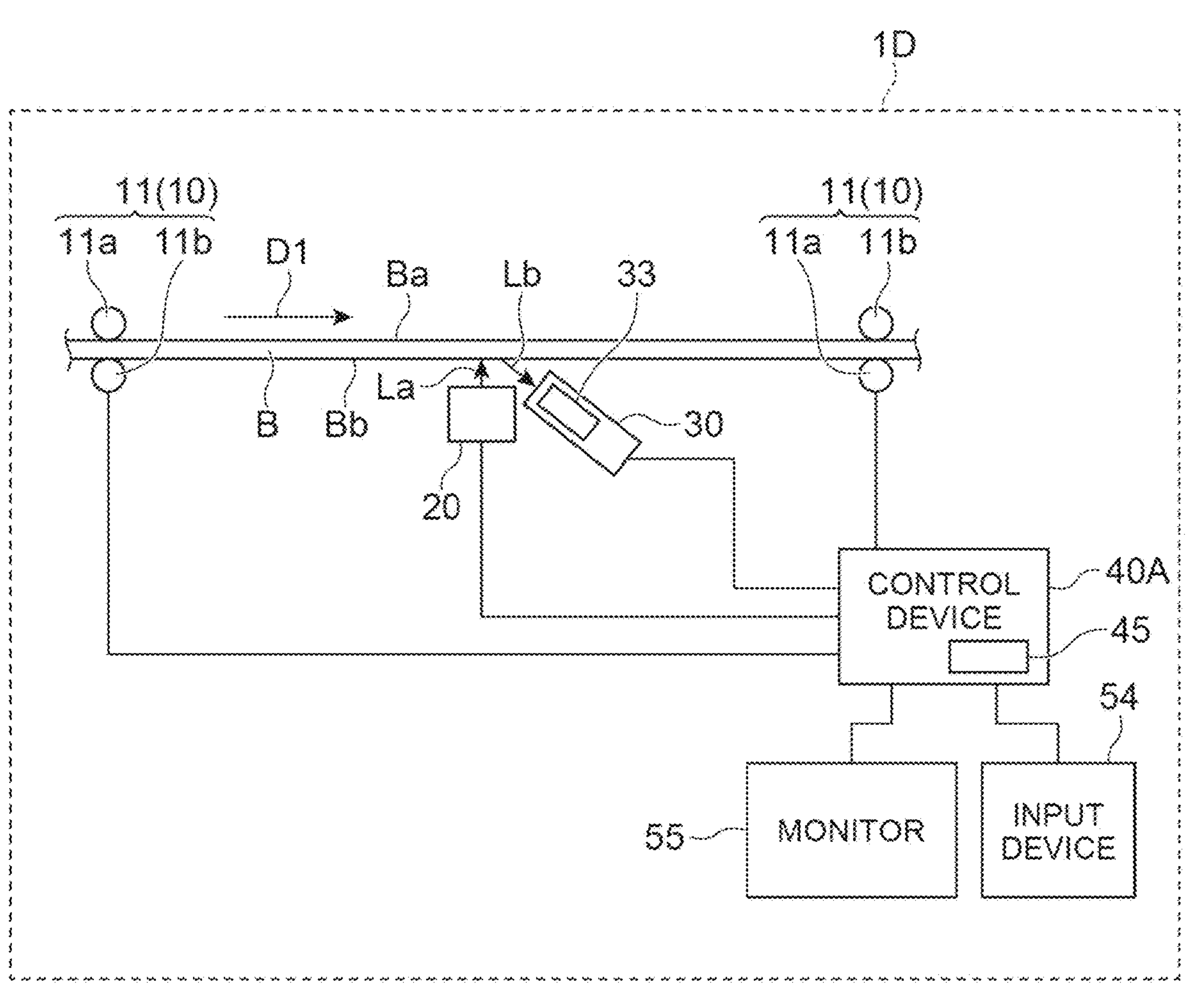
FIG. 24 is a view schematically illustrating a configuration of a thickness-distribution measurement device according to a fourth modification example.

FIG. 24 is a view schematically illustrating a configuration of a thickness-distribution measurement device 1D according to a fourth modification example. The thickness-distribution measurement device 1D of the present modification example differs from the embodiment in that the light detector 30 is disposed to face the same surface (in the illustrated example, the second surface Bb) as the surface of the object B facing the light source 20, and is identical to the embodiment in other respects. In this case, the emitted light Lb from the object B detected by the light detector 30 is light emitted from the same surface as the surface on which the light La is incident. The emitted light Lb includes light reflected on the surface opposite to the surface on which the light La is incident, namely, light that has passed through the inside of the object B. Therefore, the light intensity of the emitted light Lb changes according to the thickness of the object B.

As in the present modification example, even when the light detector 30 is disposed to face the same surface as the surface of the object B facing the light source 20, information on the distribution of the relative thickness of the object B in the width direction D2 can be obtained based on image data obtained by the image sensor 32. In the present modification example as well, in the same manner as in the third modification example, the optical axis of the lens array 33 may be inclined with respect to the normal line to the surface of the object B facing the light detector 30.

Fifth Modification Example

Figure 25:
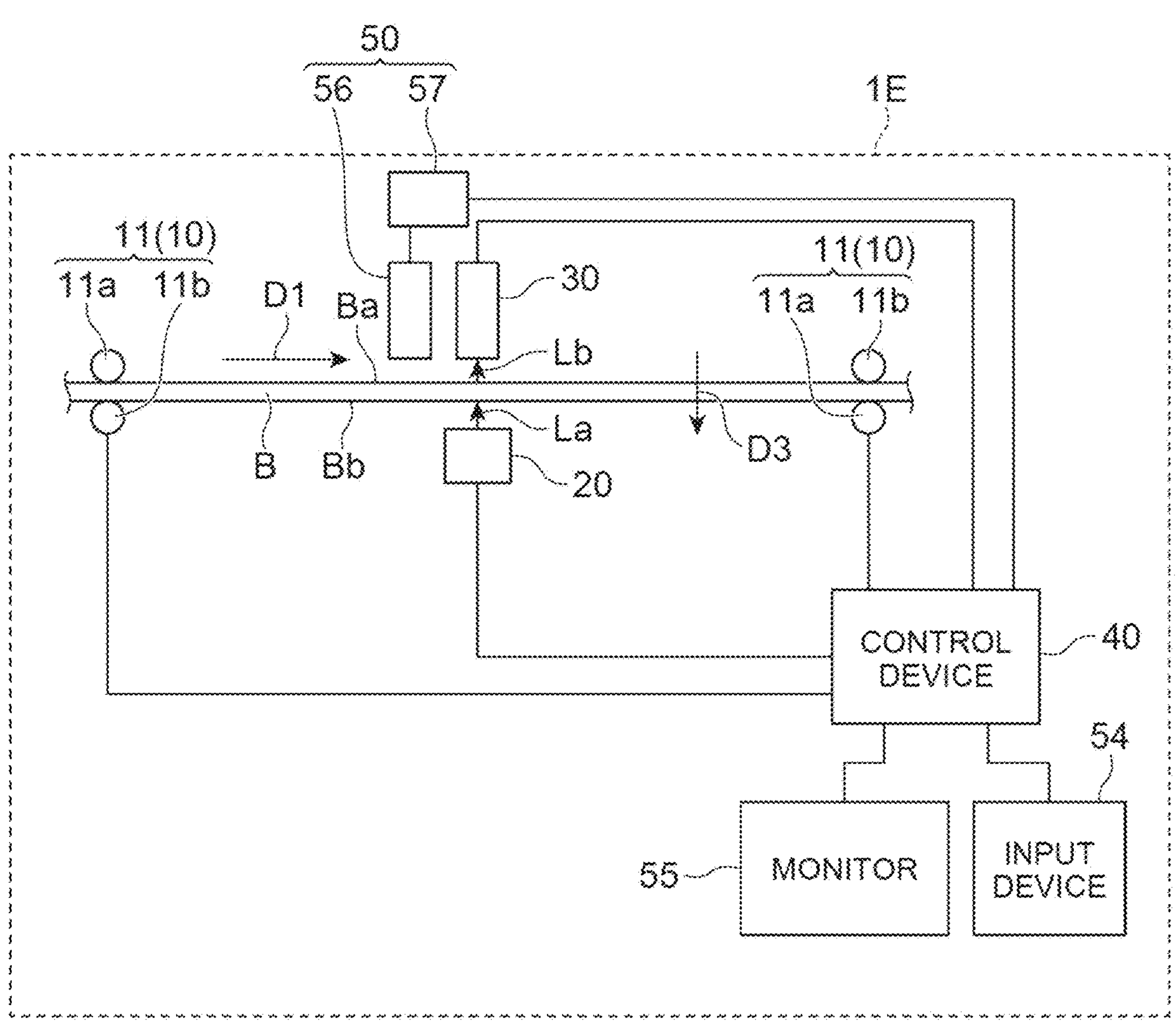
FIG. 25 is a view schematically illustrating a configuration of a thickness-distribution measurement device according to a fifth modification example.
Figure 26:
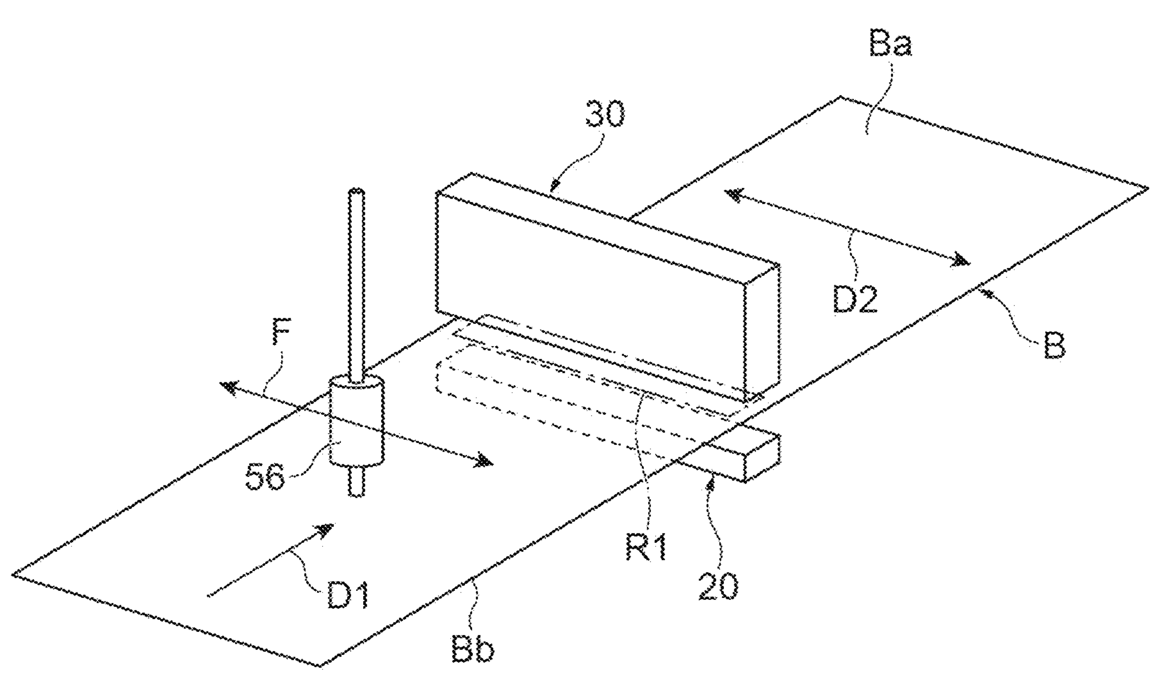
FIG. 26 is a perspective view illustrating a part of the configuration of the thickness-distribution measurement device.

FIG. 25 is a view schematically illustrating a configuration of a thickness-distribution measurement device 1E according to a fifth modification example. FIG. 26 is a perspective view illustrating a part of the configuration of the thickness-distribution measurement device 1E. The thickness-distribution measurement device 1E of the present modification example further includes a thickness measurement unit 50 in addition to the configuration of the thickness-distribution measurement device 1A of the embodiment. The thickness measurement unit 50 locally measures an absolute thickness of the object B. The thickness measurement unit 50 measures the absolute thickness of the object B using, for example, the spectral interferometry. Specifically, the thickness measurement unit 50 includes a measurement unit 56 and a control unit 57. The measurement unit 56 is disposed to face the first surface Ba, the second surface Bb, or both the first surface Ba and the second surface Bb of the object B.

Figure 27:
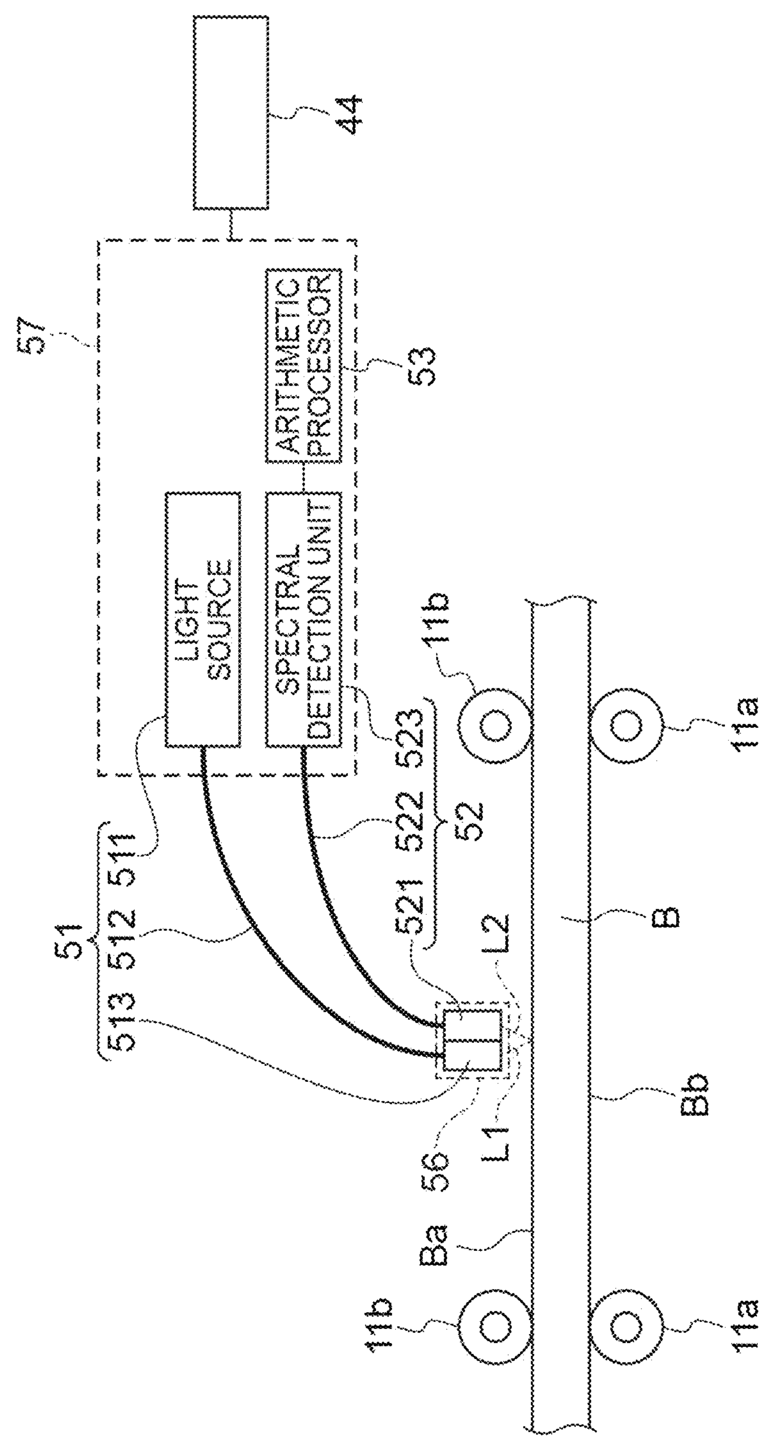
FIG. 27 is a view illustrating a specific configuration of a thickness measurement unit.

FIG. 27 is a view illustrating a specific configuration of the thickness measurement unit 50. The thickness measurement unit 50 includes a light irradiation unit 51, a light detector 52, and an arithmetic processor 53. The light irradiation unit 51 irradiates the first surface Ba or the second surface Bb of the object B with light. The light irradiation unit 51 includes a light source 511, a light guide member 512, and a light-emitting unit 513. The light source 511 generates non-coherent (incoherent) light L1. A wavelength band of the light L1 may be in the visible wavelength range, and in that case, a lamp type light source, a white LED, or the like that emits white light can be used as the light source 511. The wavelength band of the light L1 may be a wavelength band ranging from the visible wavelength range to the near-infrared wavelength range. The wavelength band of the light L1 may have a substantially flat (broad) spectrum in the infrared wavelength range. Particularly, when the wavelength band of the light L1 includes the near-infrared wavelength range, the light L1 can transmit through the object B even when the object B has a color, so that the influence of the color of the object B on a measurement result can be reduced. In that case, various light-emitting elements such as an amplified spontaneous emission (ASE) light source, an LED, and a superluminescent diode (SLD) can be applied as the light source 511. A white light source and an optical component such as an optical film may be combined with each other.

The light guide member 512 is optically coupled to the light source 511 at one end thereof, and guides the light L1 emitted from the light source 511. For example, a light guide, an optical fiber, or the like is suitably used as the light guide member 512. The light-emitting unit 513 is optically coupled to the other end of the light guide member 512, and irradiates the object B with the light L1 guided by the light guide member 512. The light-emitting unit 513 is accommodated in the measurement unit 56, and is disposed at a position facing the first surface Ba or the second surface Bb of the object B.

The light detector 52 detects an intensity (spectrum) of emitted light L2 from the object B for each wavelength. The light detector 52 includes a light incident unit 521, a light guide member 522, and a spectral detection unit 523. The emitted light L2 from the object B is incident on the light incident unit 521. The light incident unit 521 is accommodated in the measurement unit 56, and is disposed to face the same surface as a surface of the object B facing the light-emitting unit 513. Alternatively, the light incident unit 521 may be disposed to face a surface opposite to the surface of the object B facing the light-emitting unit 513. An optical axis of the light-emitting unit 513 and an optical axis of the light incident unit 521 may be parallel to each other, or may intersect each other in the object B. Alternatively, the optical axis of the light-emitting unit 513 and the optical axis of the light incident unit 521 may coincide with each other. The light guide member 522 is optically coupled to the light incident unit 521 at one end of thereof, and guides the emitted light L2 incident on the light incident unit 521. For example, a light guide, an optical fiber, or the like is used as the light guide member 522. The spectral detection unit 523 is optically coupled to the other end of the light guide member 522, spectrally separates the emitted light L2 for each wavelength, the emitted light L2 being guided by the light guide member 522, and detects an intensity of the spectrally-separated light for each wavelength. The spectral detection unit 523 is suitably configured, for example, by combining a spectral optical element and an imaging element. The spectral detection unit 523 outputs the detected light intensity as an electrical signal. The spectral optical element is, for example, a prism or a grating element. The imaging element is, for example, a line sensor, an area image sensor, a photomultiplier tube, or a photodiode.

The arithmetic processor 53 obtains the absolute thickness of the object B based on the detection result in the light detector 52. Namely, the arithmetic processor 53 obtains the absolute thickness of the object B by comparing a measured spectral reflectance that is a reflectance for each wavelength obtained based on the detection result in the light detector 52 and a theoretical spectral reflectance that is a theoretical reflectance for each wavelength, and fitting the measured spectral reflectance and the theoretical spectral reflectance to each other. Data on the absolute thickness of the object B obtained in this way is provided to the arithmetic processor 44. The light source 511, the spectral detection unit 523, and the arithmetic processor 53 are included in the control unit 57.

Figure 28:
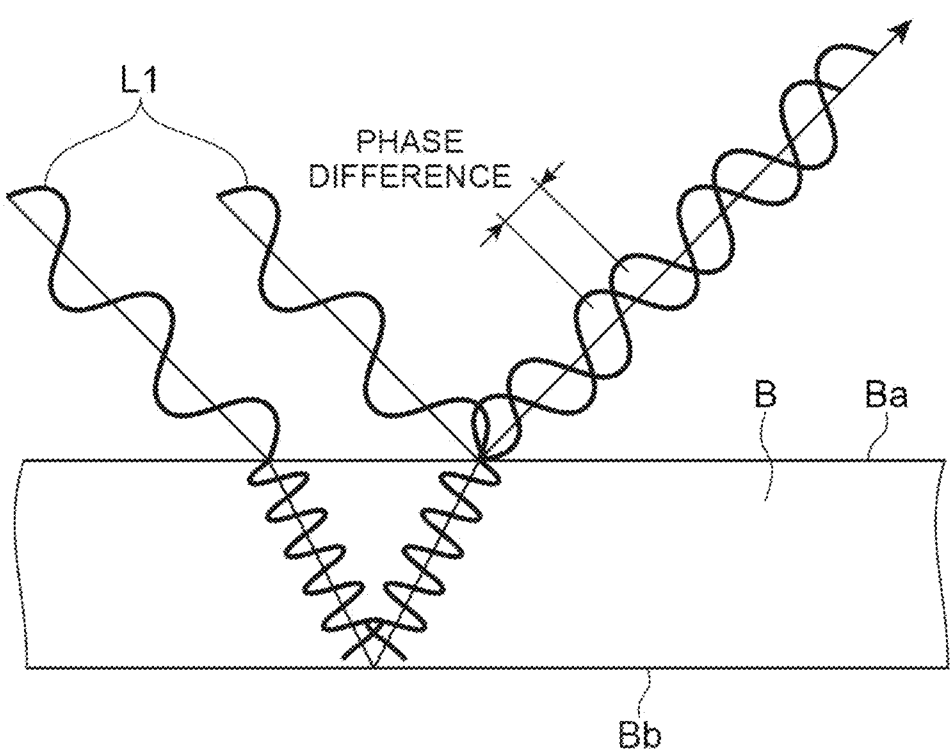
FIG. 28 is a view for describing the principle of thickness measurement, and schematically illustrates a cross-section of the object.

Here, a thickness measurement method using the thickness measurement unit 50 will be described in detail. FIG. 28 is a view for describing the principle of thickness measurement, and schematically illustrates a cross-section of the object B. In this case, when the incoherent light L1 is incident on the object B, reflected light on the first surface Ba of the object B and reflected light on the second surface Bb of the object B interfere with each other. When the first surface Ba is a light incident surface, an optical path length of the reflected light on the second surface Bb is longer than an optical path length of the reflected light on the first surface Ba by an optical path inside the object B. Therefore, a phase difference corresponding to the thickness of the object B occurs between these reflected lights.

Figure 29:
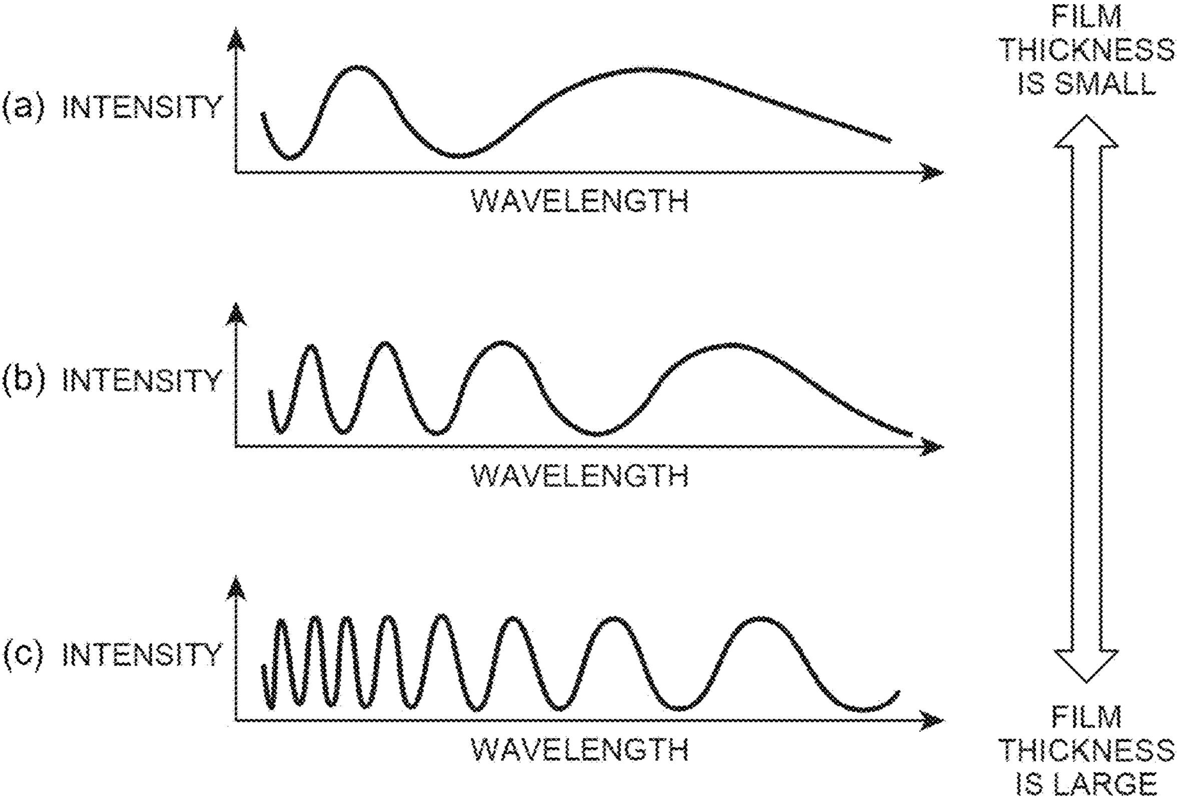
FIG. 29 Parts (a), (b), and (c) in FIG. 29 are graphs illustrating a relationship between the intensity and the wavelength of reflected light after interference.

Parts (a), (b), and (c) in FIG. 29 are graphs illustrating a relationship between the intensity and the wavelength of reflected light after interference. Part (a) in FIG. 29 illustrates a case where the thickness of the object B is thinner than that in parts (b) and (c). Part (c) in FIG. 29 illustrates a case where the thickness of the object B is thicker than that in parts (a) and (b). As illustrated in FIG. 29, the spectrum of the reflected light after interference (reflection spectrum) undulates due to the interference. The interval of the waves, namely, the period of the waves becomes as the thickness of the object B becomes thicker.

The absolute thickness of the object B can be obtained using the above-described relationship between the reflection spectrum and the thickness of the object B. Specific methods include a fast Fourier transform method and a curve fitting method. The fast Fourier transform method is a method in which a fast Fourier transform is performed on a reflection spectrum and a film thickness is obtained from a peak frequency thereof. The curve fitting method is a method in which a measured spectral reflectance, namely, a spectral reflectance obtained from a measured reflection spectrum and a theoretical spectral reflectance calculated from a theoretical formula are fitted to each other and a film thickness is obtained from the fitted theoretical spectral reflectance. According to the curve fitting method, the thickness of the object B can be measured with high accuracy even when the thickness is 1 μm or less.

As described above, the information on the distribution of the relative thickness of the object B calculated by the arithmetic processor 44 is affected by a variation over time in the light intensity of the light La with which the object B is irradiated, or the like. The arithmetic processor 44 of the present modification example corrects the measurement value of the distribution of the relative thickness based on the absolute thickness measured by the thickness measurement unit 50. Specifically, the magnitude of the parameter of Formula (1) such as the light intensity $I_0$ is corrected such that the relative thickness x obtained by Formula (1) coincides with the absolute thickness at the point where the absolute thickness is measured by the thickness measurement unit 50.

Figure 30:
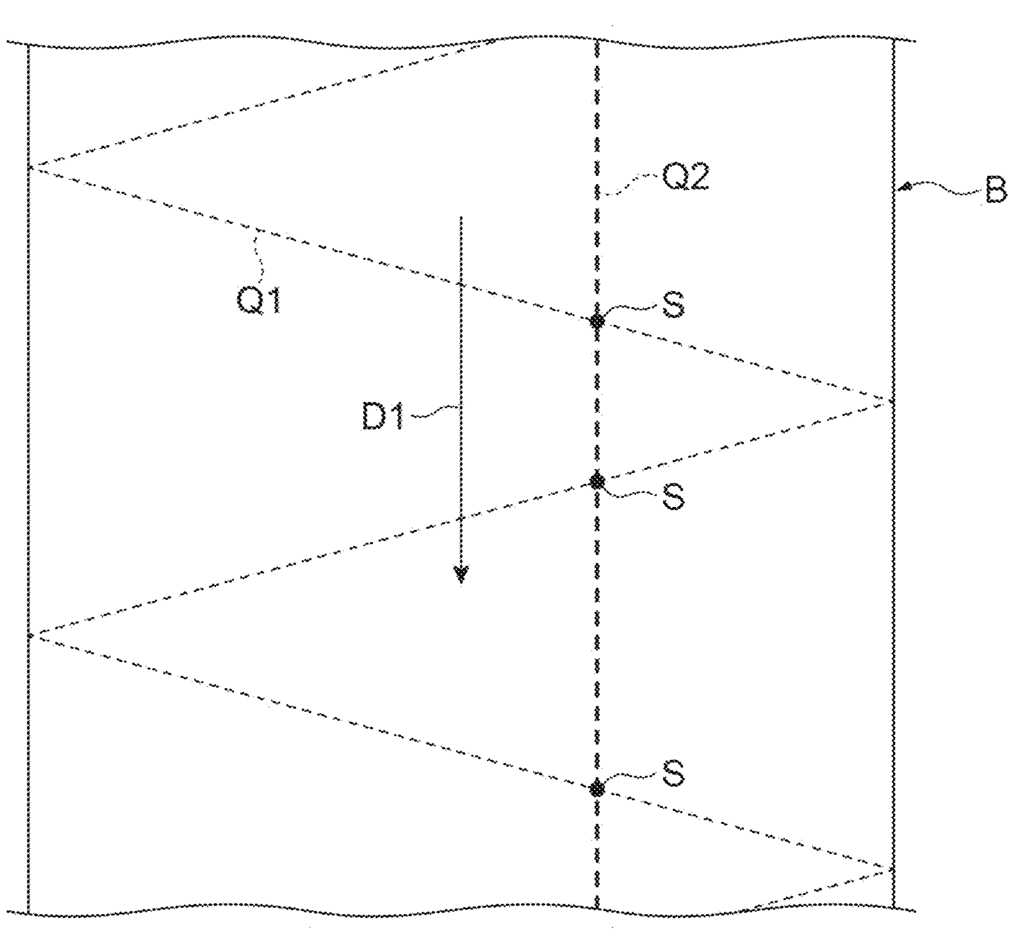
FIG. 30 is a plan view illustrating a measurement line created by the thickness measurement unit.

As indicated by double-headed arrow F in FIG. 26, the measurement unit 56 may perform irradiation with the light L1 and detection of the emitted light L2 while moving along the width direction D2 of the object B. FIG. 30 is a plan view illustrating a measurement line Q1 created by the thickness measurement unit 50 in that case. The object B is conveyed at a constant speed along the conveying direction D1. Therefore, when the measurement unit 56 moves back and forth at a constant speed along the width direction D2, as illustrated in FIG. 30, the trajectory of measurement points created by the thickness measurement unit 50 forms the measurement line Q1 in a zigzag shape. Then, the absolute thickness of the object B is measured only at the measurement line Q1. Meanwhile, the positions of measurement points where the relative thickness of the object B is measured based on the detection result at a certain one pixel 322 of the image sensor 32 are unchanged in the width direction D2. Therefore, the trajectory of measurement points where the relative thickness is measured by a certain one pixel 322 forms a measurement line Q2 extending along the conveying direction D1. The arithmetic processor 44 can correct the measurement value of the relative thickness obtained from the detection result at the one pixel 322 at a point S where the measurement line Q1 and the measurement line Q2 intersect each other.

Figure 31:
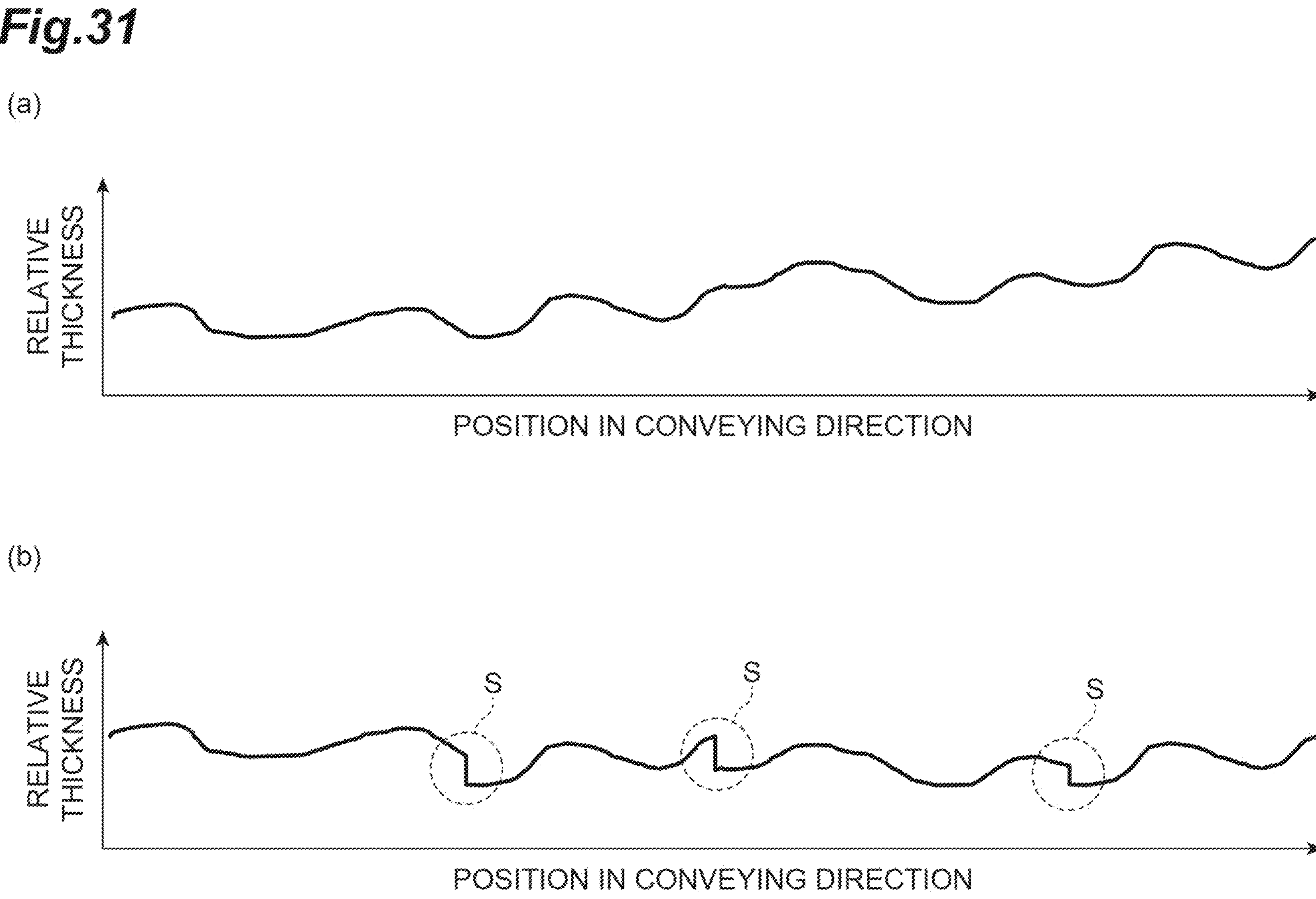
FIG. 31 Part (a) in FIG. 31 is a graph illustrating an example of the measurement result of a thickness when an arithmetic processor does not correct the measurement value of a relative thickness. Part (b) in FIG. 31 is a graph illustrating an example of the measurement result of the thickness when the arithmetic processor corrects the measurement value of the relative thickness.

Part (a) in FIG. 31 is a graph illustrating an example of the measurement result of the thickness x when the arithmetic processor 44 does not correct the measurement value of the relative thickness. Part (b) in FIG. 31 is a graph illustrating an example of the measurement result of the thickness x when the arithmetic processor 44 corrects the measurement value of the relative thickness. In parts (a) and (b) of FIG. 31, the vertical axis represents the relative thickness of the object B at the measurement line Q2, and the horizontal axis represents the position of the object B in the conveying direction D1. As illustrated in part (a) of FIG. 31, when the arithmetic processor 44 does not correct the measurement value of the relative thickness, the measurement value of the relative thickness gradually increases or decreases due to a variation over time in the light intensity of the light La caused by a change over time in the characteristics of the light source 20. On the other hand, as illustrated in part (b) of FIG. 31, when the arithmetic processor 44 corrects the measurement value of the relative thickness, the parameter for calculating the measurement value of the relative thickness is corrected at the point S. Therefore, regardless of a variation over time in the light intensity of the light La, an increase or decrease in the measurement value of the relative thickness can be suppressed.

The thickness-distribution measurement device and the thickness-distribution measurement method according to the present disclosure are not limited to the above-described embodiment, and various other modifications can be made. For example, the first to fifth modification examples described above may be combined with each other depending on the required purpose and effect. In the embodiment, a case where each of the plurality of lenses 331 is a rod lens has been provided as an example; however, each of the plurality of lenses 331 may be a lens of another form, for example, a convex lens.

The principles of the present invention have been illustrated and described in the preferred embodiments; however, those skilled in the art will recognize that the present invention can be changed in disposition and details without departing from such principles. The present invention is not limited to the specific configurations disclosed in the present embodiment. Therefore, rights to all modifications and changes deriving from the claims and the scope of the concept thereof are claimed.

REFERENCE SIGNS LIST 1A, 1B, 1C, 1D, 1E: thickness-distribution measurement device, 10: conveyor, 11: roller pair, 11*a*, 11*b*: roller, 20, 21: light source, 30, 30A, 30B: light detector, 31: housing, 32: image sensor, 33: lens array (lens unit), 34: circuit substrate, 34*a*: mounting surface, 35: optical filter unit, 36: optical filter group, 37 to 39: optical filters, 40, 40A: control device, 41: conveyance control unit, 42: light source control unit, 43: detection control unit, 44: arithmetic processor, 45: scratch detection unit, 50: thickness measurement unit, 51: light irradiation unit, 52: light detector, 53: arithmetic processor, 54: input device, 55: monitor, 56: measurement unit, 57: control unit, 60: readout circuit, 61: hold circuit, 62, 63: switch, 64: photodiode, 65, 66: MOS transistor, 67: source follower amplifier, 68: capacitance element, 69: charge amplifier, 70: sensor control unit, 81: video line, 101: measurement unit, 311: top plate, 312: bottom plate, 313, 314: side plate, 315: slit, 318, 319: holding member, 321: pixel unit, 322: pixel, 331: lens, 332: light incident end surface, 333: light-emitting end surface, 401: processor, 402: ROM, 403: RAM, 404: auxiliary storage device, 511: light source, 512: light guide member, 513: light-emitting unit, 521: light incident unit, 522: light guide member, 523: spectral detection unit, 671: MOS transistor, 672: operation control switch, 673: current source, 674: connecting node, 691: amplifier, 692: capacitance unit, 693: reset switch, 694, 695: capacitance element, 696: switch, B: object, Ba: first surface, Bb: second surface, D1: conveying direction, D2: width direction, D3: direction, E: scratch, F: double-headed arrow, G1 to G3: curves, L1, La, Lc: light, L2, Lb: emitted light, Q1, Q2: measurement line, R1: region, S: point.

The invention claimed is:

1. A thickness-distribution measurement device comprising:

a conveyor configured to convey an object including a first surface and a second surface in a conveying direction along the first surface and the second surface, the second surface facing opposite to the first surface;

a light source that is disposed at a position facing the second surface of the object, and that is configured to irradiate a region of the object being conveyed with light, the region extending in a width direction intersecting the conveying direction;

a light detector that is disposed at a position facing the first surface of the object, and that is configured to detect emitted light that has transmitted through the object irradiated with the light; and an arithmetic processor configured to obtain information on a distribution of a relative thickness of the region of the object in the width direction based on a detection result in the light detector, wherein the light detector includes an image sensor that includes a pixel unit including a plurality of pixels arranged at least in the conveying direction, and that is configured to detect an intensity of the emitted light for each pixel to output image data, and a lens unit that includes a plurality of lenses having an equal magnification and arranged along the width direction, and that is configured to collect the emitted light and forms an image of the emitted light on the pixel unit of the image sensor, the image sensor is configured to be able to switch a gain value for amplifying signals output from the plurality of pixels, and the thickness-distribution measurement device further comprising:

another light source that is disposed at a position facing the first surface, and that is configured to irradiate the region or another region of the object being conveyed with light, the another region extending in the width direction, wherein the light detector is configured to detect emitted light emitted from the object irradiated with the light by the another light source, and the gain value of the image sensor when irradiation with the light from the another light source is performed is different from the gain value of the image sensor when irradiation with the light from the light source is performed.

2. The thickness-distribution measurement device according to claim 1, wherein an optical axis of the lens unit is along a normal line to the first surface.

3. The thickness-distribution measurement device according to claim 1, wherein an optical axis of the lens unit is inclined with respect to a normal line to the first surface.

4. The thickness-distribution measurement device according to claim 3, wherein an inclination angle of the optical axis of the lens unit with respect to the normal line is 5° or more and 80° or less.

5. The thickness-distribution measurement device according to claim 1, further comprising:

a thickness measurement unit configured to locally measure an absolute thickness of the object, wherein the arithmetic processor is configured to correct a measurement value of the relative thickness based on the absolute thickness measured by the thickness measurement unit.

6. The thickness-distribution measurement device according to claim 1, wherein the image sensor is a line scan sensor.

7. The thickness-distribution measurement device according to claim 1, wherein the light detector further includes a first optical filter provided on some pixels among the plurality of pixels of the image sensor, and having a transmission wavelength band centered at a first wavelength, and a second optical filter provided on at least some other pixels among the plurality of pixels of the image sensor, and having a transmission wavelength band centered at a second wavelength different from the first wavelength.

8. A thickness-distribution measurement method comprising:

starting to convey an object having a first surface and a second surface in a conveying direction along the first surface and the second surface, the second surface facing opposite to the first surface;

starting to irradiate a region of the object being conveyed with light, the region extending in a width direction intersecting the conveying direction;

starting to detect emitted light that has transmitted through the object irradiated with the light; and obtaining information on a distribution of a relative thickness of the region of the object in the width direction based on a detection result of the emitted light, wherein in the starting to detect, an image sensor that includes a pixel unit including a plurality of pixels arranged at least in the width direction, and that detects an intensity of the emitted light for each pixel to output image data, and a lens unit that includes a plurality of lenses having an equal magnification and arranged along the width direction, and that collects the emitted light and forms an image of the emitted light on the pixel unit of the image sensor are used, the image sensor is configured to be able to switch a gain value for amplifying signals output from the plurality of pixels, the thickness-distribution measurement method further comprising:

starting to irradiate the region or another region of the object being conveyed with light from another light source disposed at a position facing the first surface, the another region extending in the width direction; and detecting emitted light emitted from the object irradiated with the light by the another light source, wherein the gain value of the image sensor when irradiation with the light from the another light source is performed is different from the gain value of the image sensor when irradiation with the light from the light source is performed.

9. The thickness-distribution measurement method according to claim 8, wherein an optical axis of the lens unit is along a normal line to the first surface.

10. The thickness-distribution measurement method according to claim 8, wherein an optical axis of the lens unit is inclined with respect to a normal line to the first surface.

11. The thickness-distribution measurement method according to claim 10, wherein an inclination angle of the optical axis of the lens unit with respect to the normal line is 5° or more and 80° or less.

12. The thickness-distribution measurement method according to claim 8, further comprising:

locally measuring an absolute thickness of the object, wherein in the obtaining the information, a measurement value of the relative thickness is corrected based on the absolute thickness measured by the measuring.

* * * * *